Figure 1:
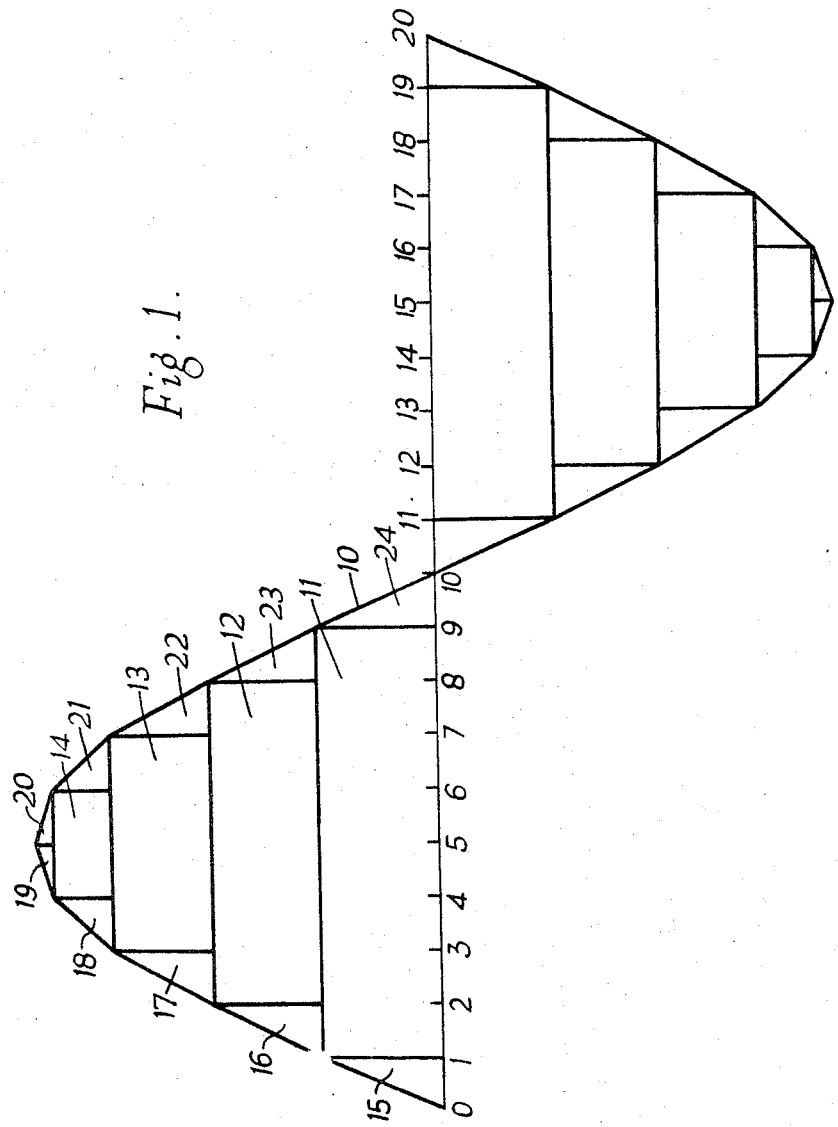

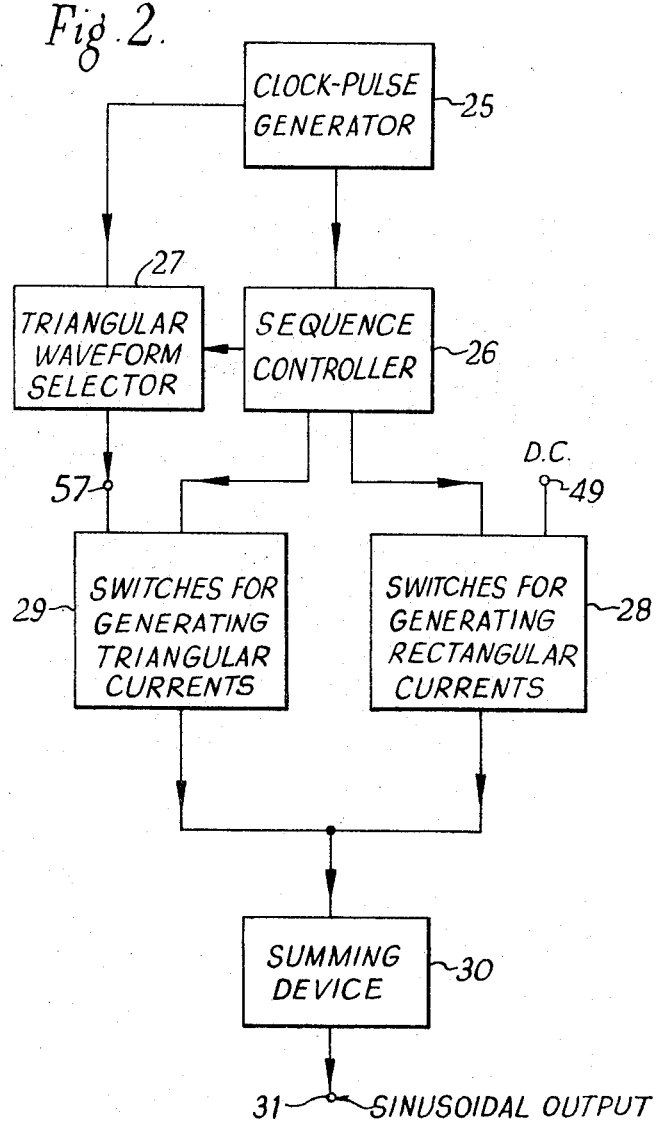

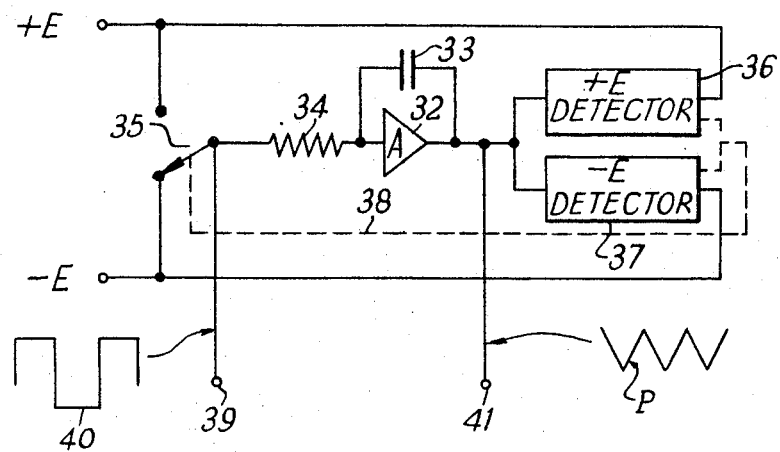
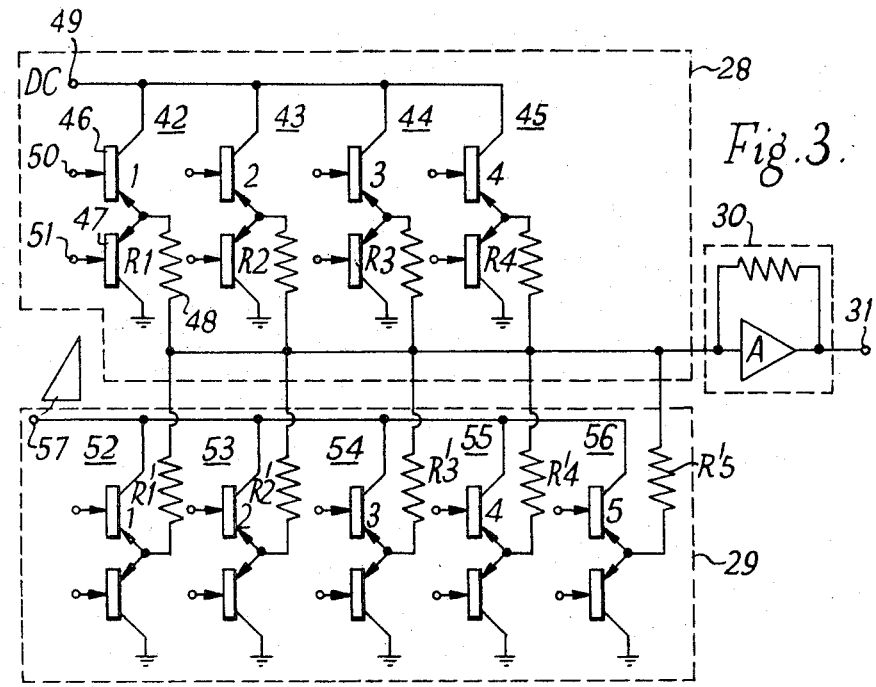

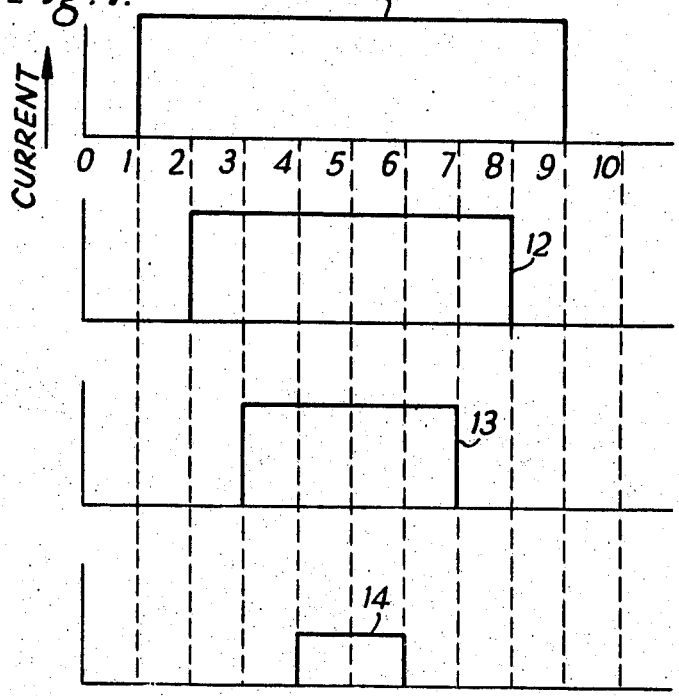
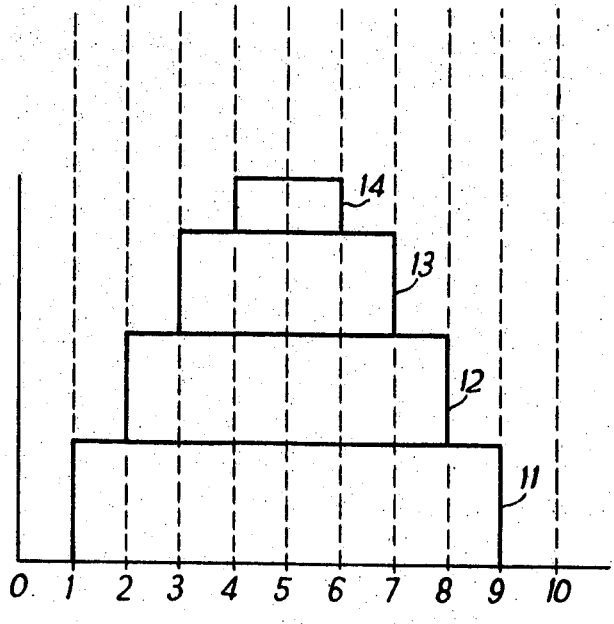

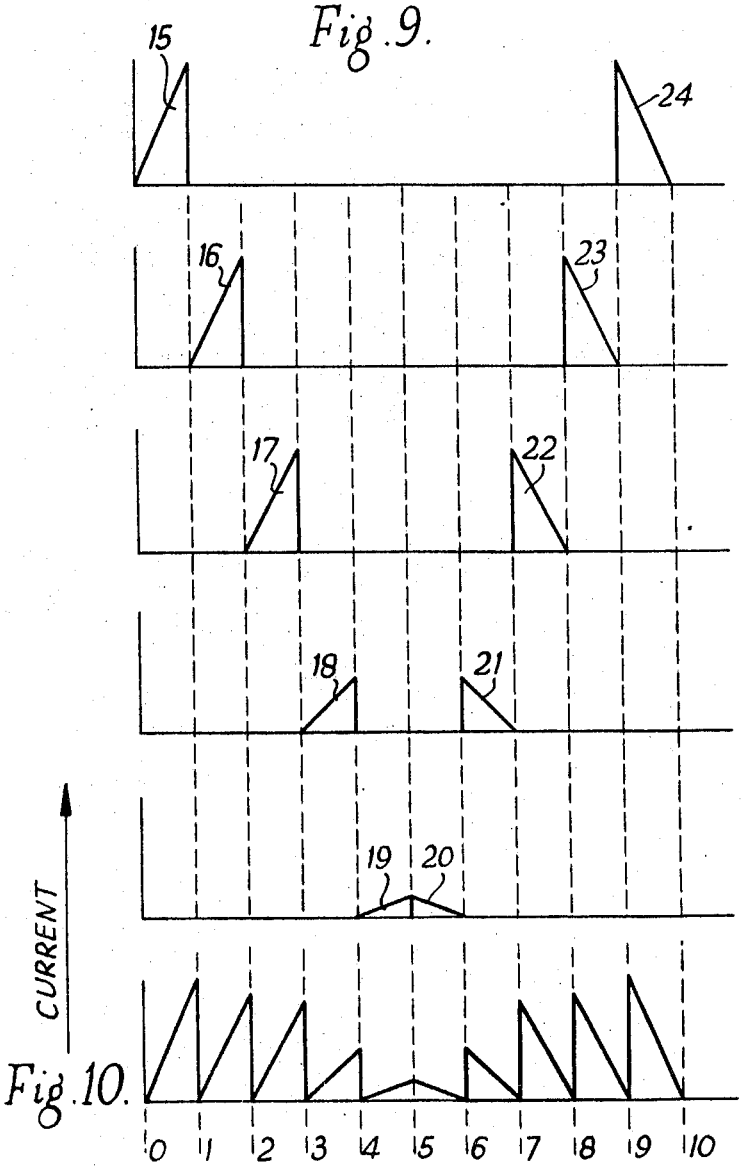

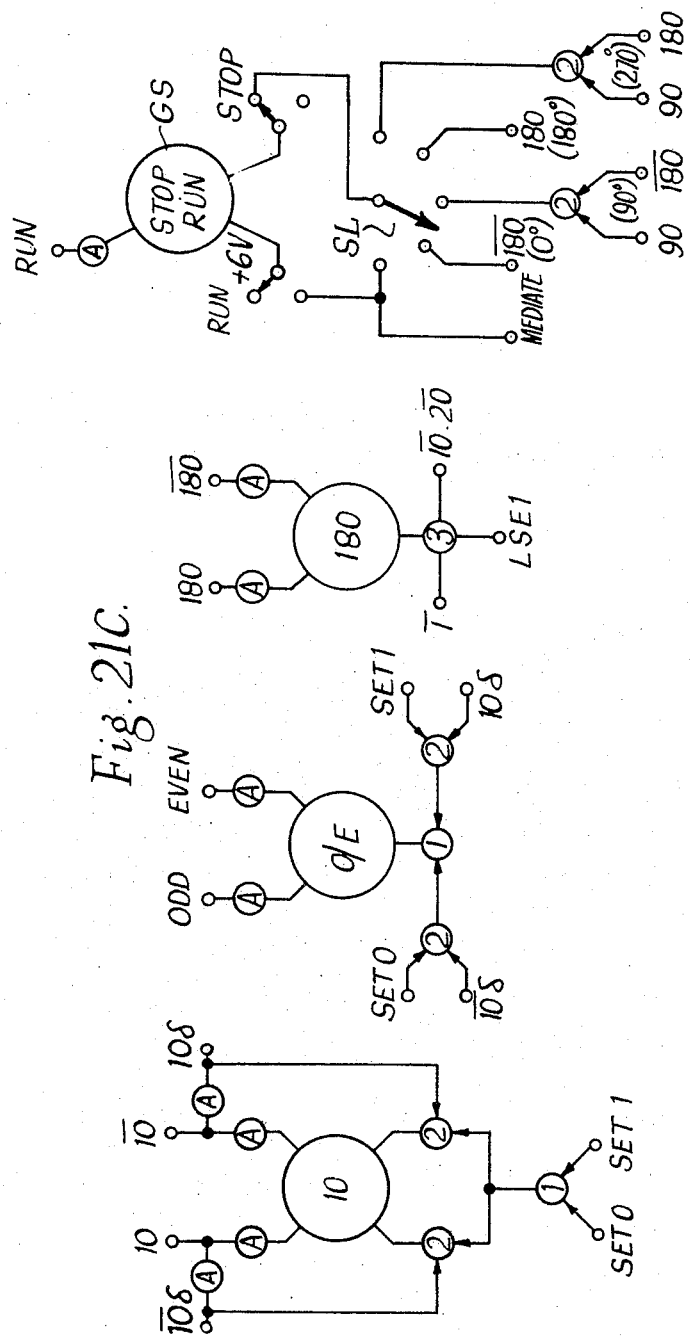

United States Patent Office 3,340,469
Patented Sept. 5, 1967

3,340,469
TRANSFER FUNCTION TESTING APPARATUS UTILIZING A SINE WAVE TRANSFER FUNCTION OBTAINED BY COMBINING RECTANGULAR AND TRIANGULAR WAVEFORMS
Reginald Catherall and Howard Anthony Dorey, both of Victoria Road, Farnborough, England
Continuation of application Ser. No. 298,988, July 31, 1963. This application July 26, 1966, Ser. No. 568,058
39 Claims. (Cl. 324—57)

This application is a continuation of application Ser. No. 298,988 filed July 31, 1963, which, in turn, was a continuation-in-part of application Ser. No. 160,045 filed Dec. 18, 1961, both of which are now abandoned.

The present invention relates to electric circuits and methods.

For some purposes it is required to generate an oscillation of substantially sinusoidal form whose frequency and amplitude are accurately known and whose frequency can be varied over a wide range, such as 0.00001 to 1500 c./s. This requirement arises for example in testing servo mechanisms.

To provide a generator capable of meeting these requirements presents problems and it is one object of the present invention to provide a method and apparatus whereby these requirements can be met.

According to the present invention in one of its aspects, a method of generating an electric oscillation of given waveform, frequency and amplitude, comprises the steps of generating a plurality of separate currents of rectangular waveform, a plurality of separate currents of triangular waveform, and summing the currents of rectangular and triangular waveform to provide an oscillatory current of composite waveform, the relationship of the currents of rectangular and triangular waveform being predetermined and such that the oscillatory current of composite waveform has the given waveform, frequency and amplitude.

The generation of the triangular and rectangular currents can be effected by means of clock pulses and switching circuits whereby frequency is determined solely by the clock pulses. Thus sinusoidal oscillations of relatively low frequency can be generated by clock pulses of relatively high frequency whereby circuit engineering is facilitated. The switches can be simple transistor switches whereby again circuit engineering is facilitated. The determination of amplitude is governed by the potentials applied to the switches and these can readily be stabilised and hence the amplitude of the sinusoidal oscillation can be accurately controlled.

The waveform of the composite oscillation is determined by the shapes of the rectangular and triangular currents as will be clear from the description hereinafter.

The currents of rectangular and triangular waveform can be derived from direct current or can be pulses of oscillatory current referred to hereinafter as oscillatory carrier current.

According to the invention in another of its aspects apparatus for generating an oscillation of given waveform, frequency and amplitude comprises means for generating a plurality of separate currents of rectangular waveform and means for generating a plurality of separate currents of triangular waveform, both the said means being connected to a summing device adapted to sum the currents of rectangular and triangular waveform to provide an oscillatory current of composite waveform, the relationship of currents of rectangular and triangular waveform being predetermined and such that the oscillatory current of composite waveform has the given waveform, frequency and amplitude.

The invention has the additional advantage that it facilitates the testing of the transfer functions of electrical apparatus responsive to control signals. In testing such apparatus an oscillation generated by means of the invention is applied to the apparatus to be tested and an output signal of the apparatus is resolved into the components thereof which are respectively in phase and in quadrature with the applied oscillation. The apparatus for resolving the output signal into these two components may consist of two resolvers each identical with the apparatus for generating the applied oscillation and controlled from the same clock-pulse generator and switching-sequence-control device. Furthermore by manipulation of the two resolvers as will be described the result of the test can readily be converted from cartesian form, that is in-phase and quadrature components, into polar form, that is phase angle $\theta$ and amplitude R.

Figure 4:
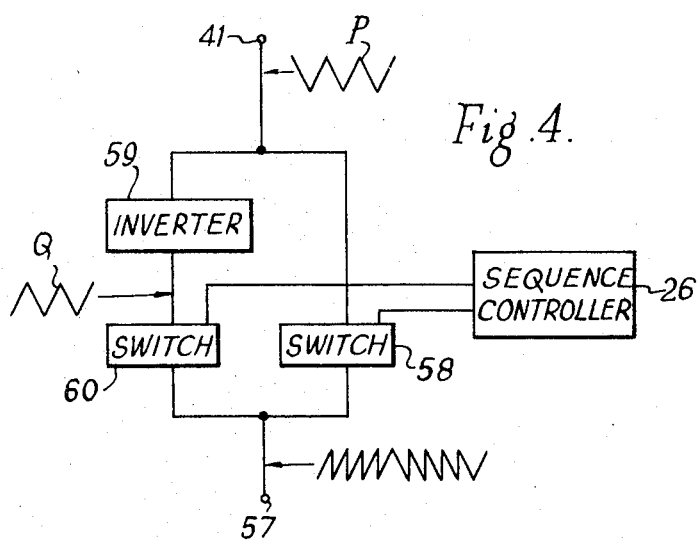
Figure 5:
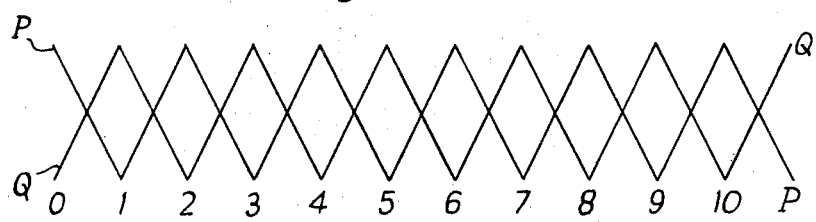
Figure 6:
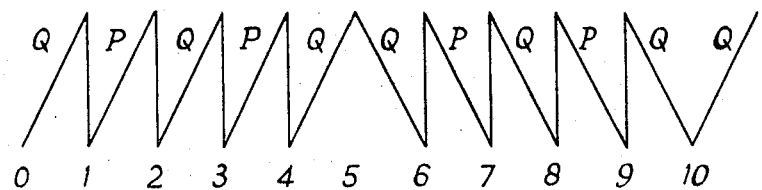
Figure 11:
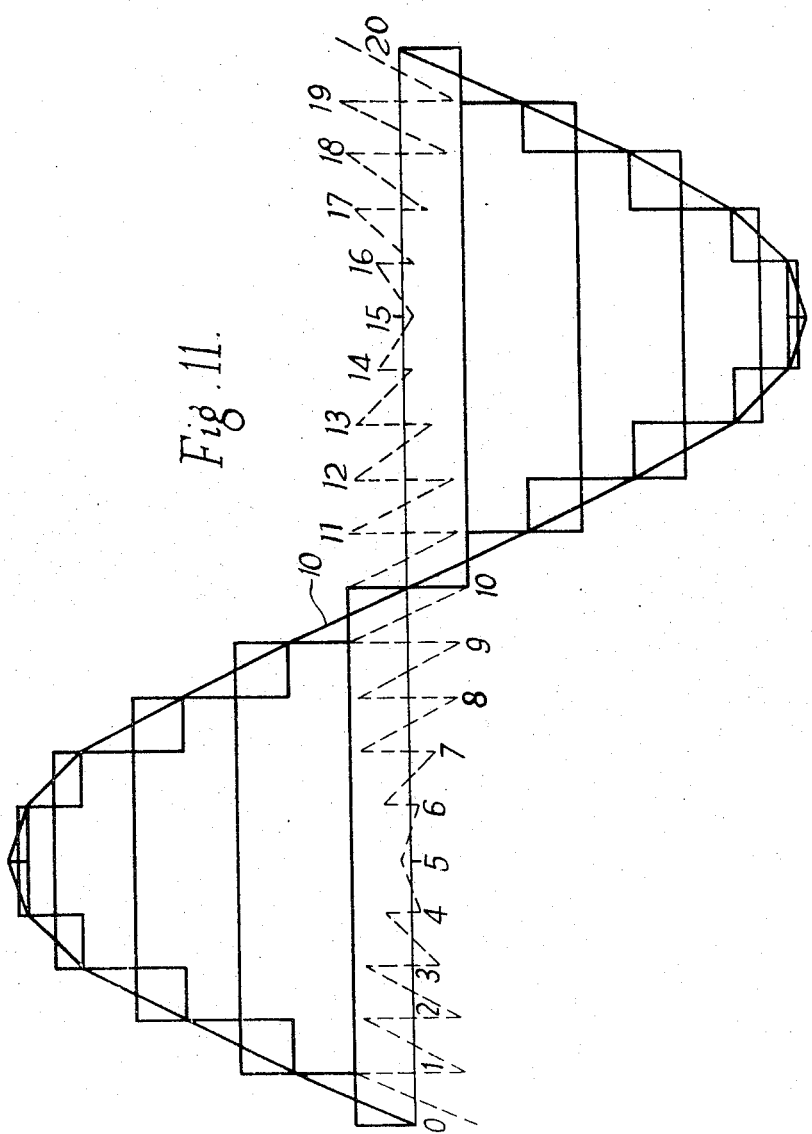
Figure 12:
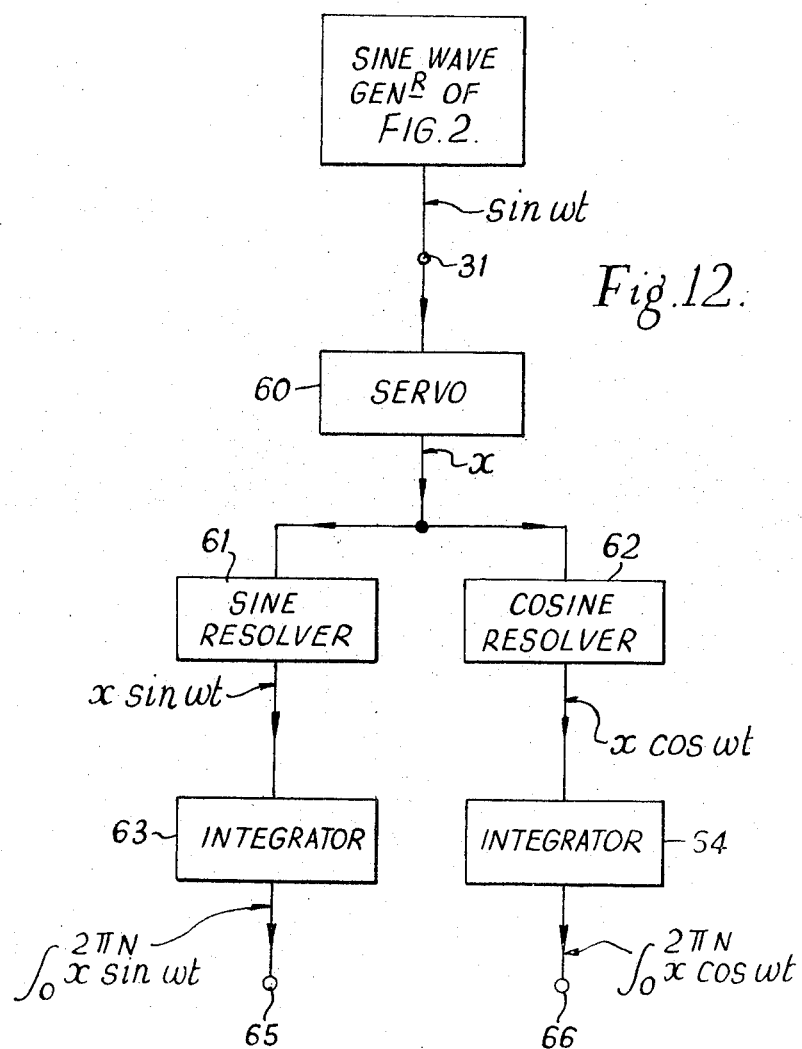
Figure 13:
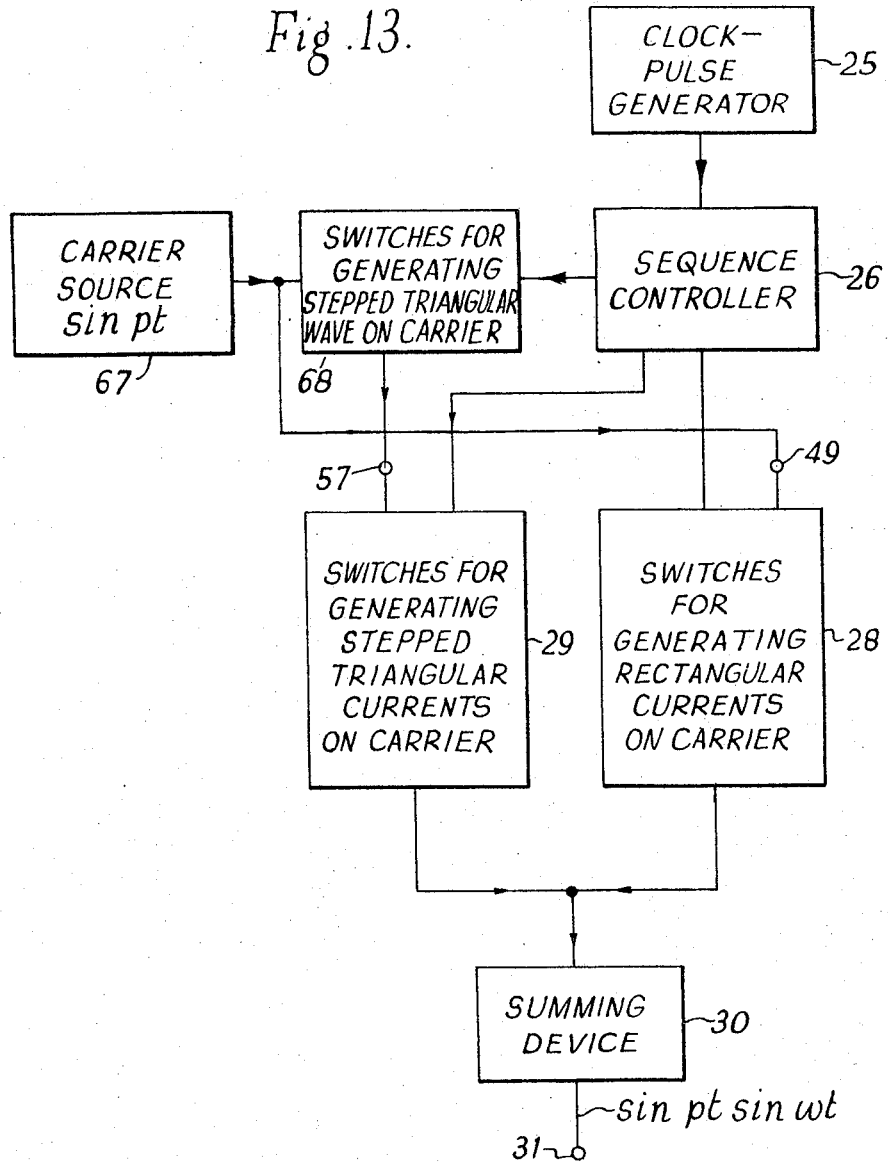
Figure 14:
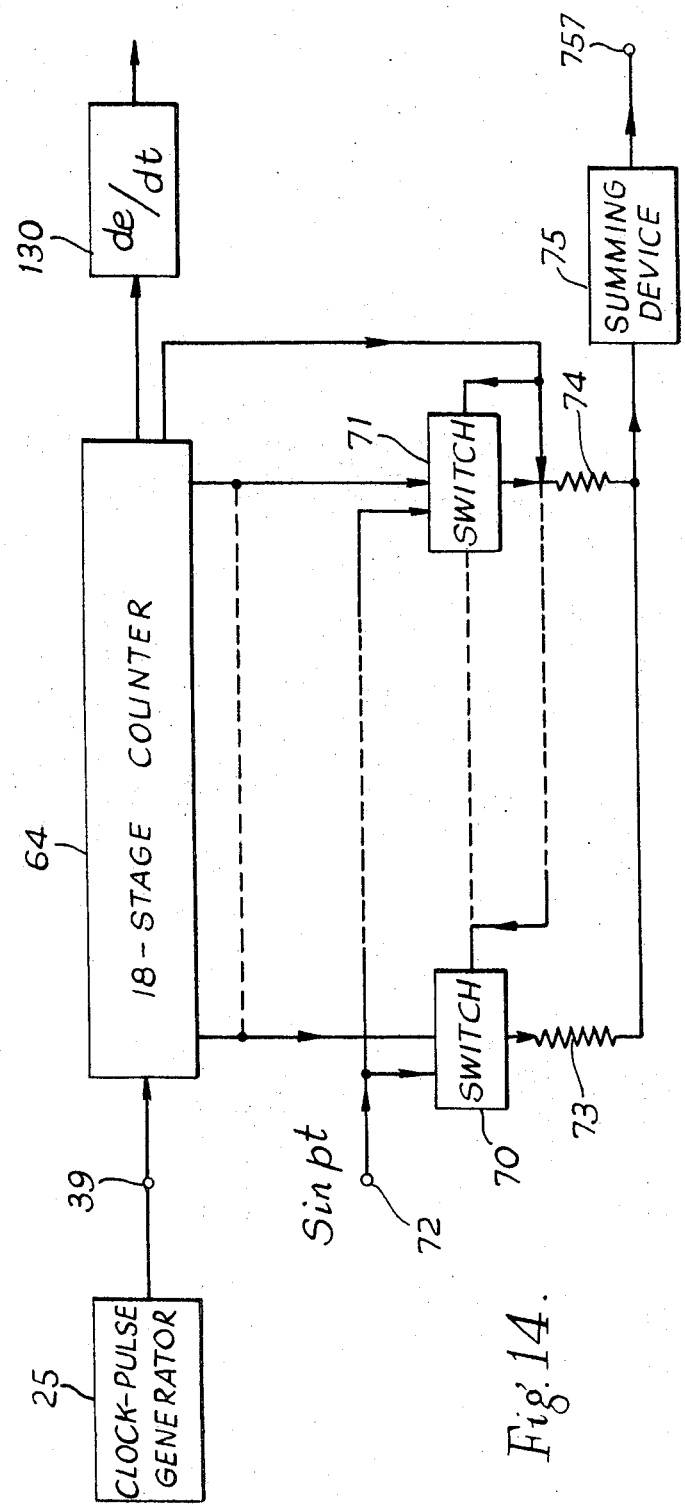
Figure 15:
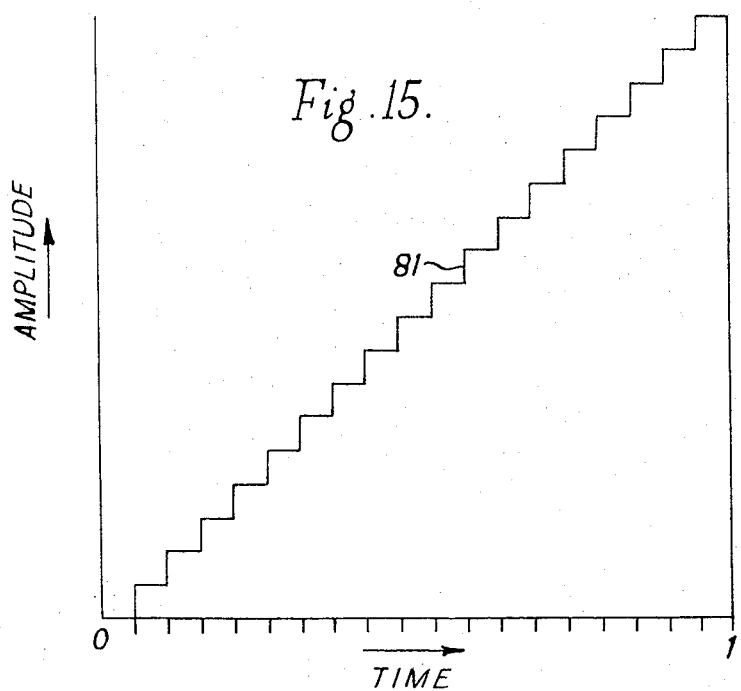
Figure 16:
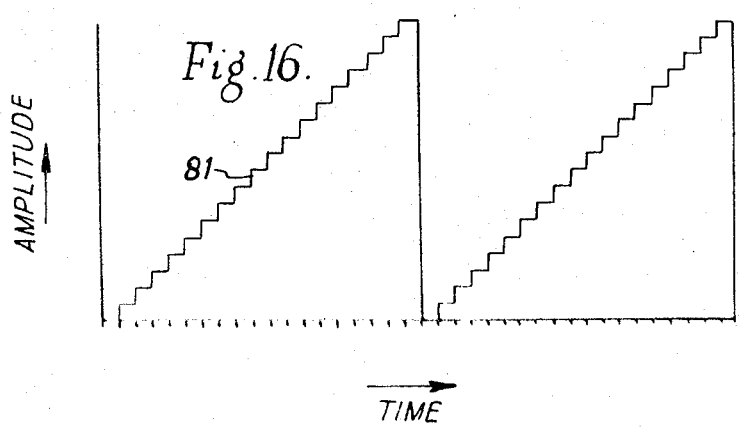
Figure 17:
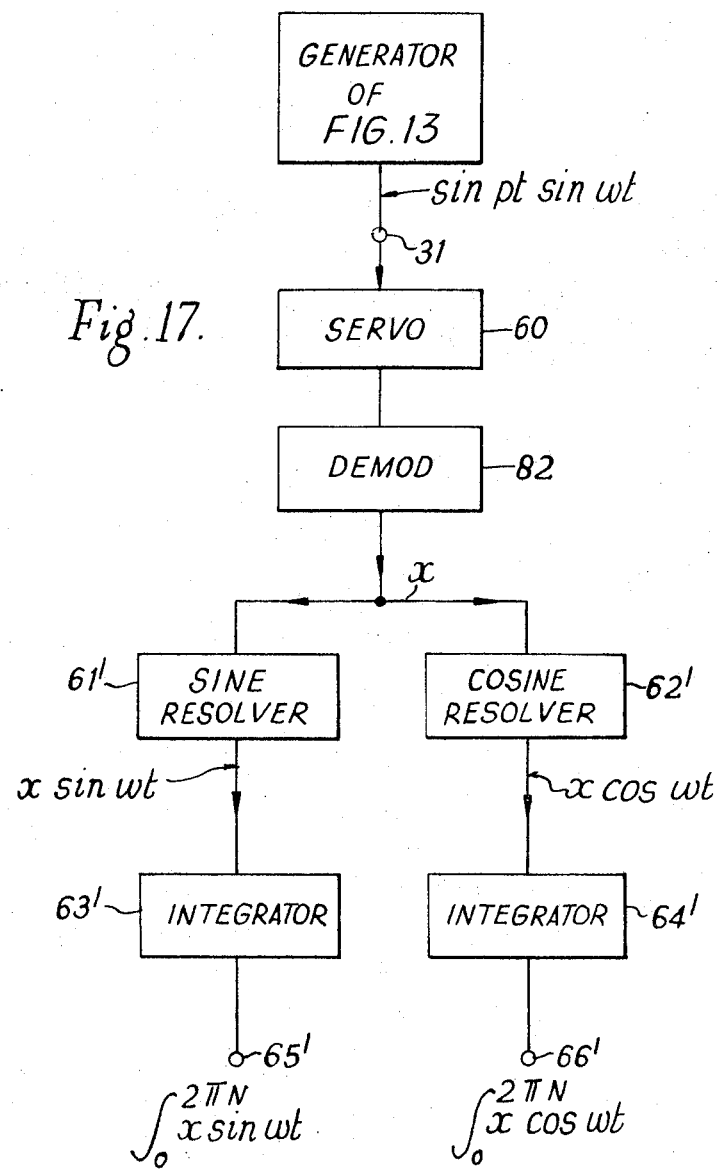
Figure 18:
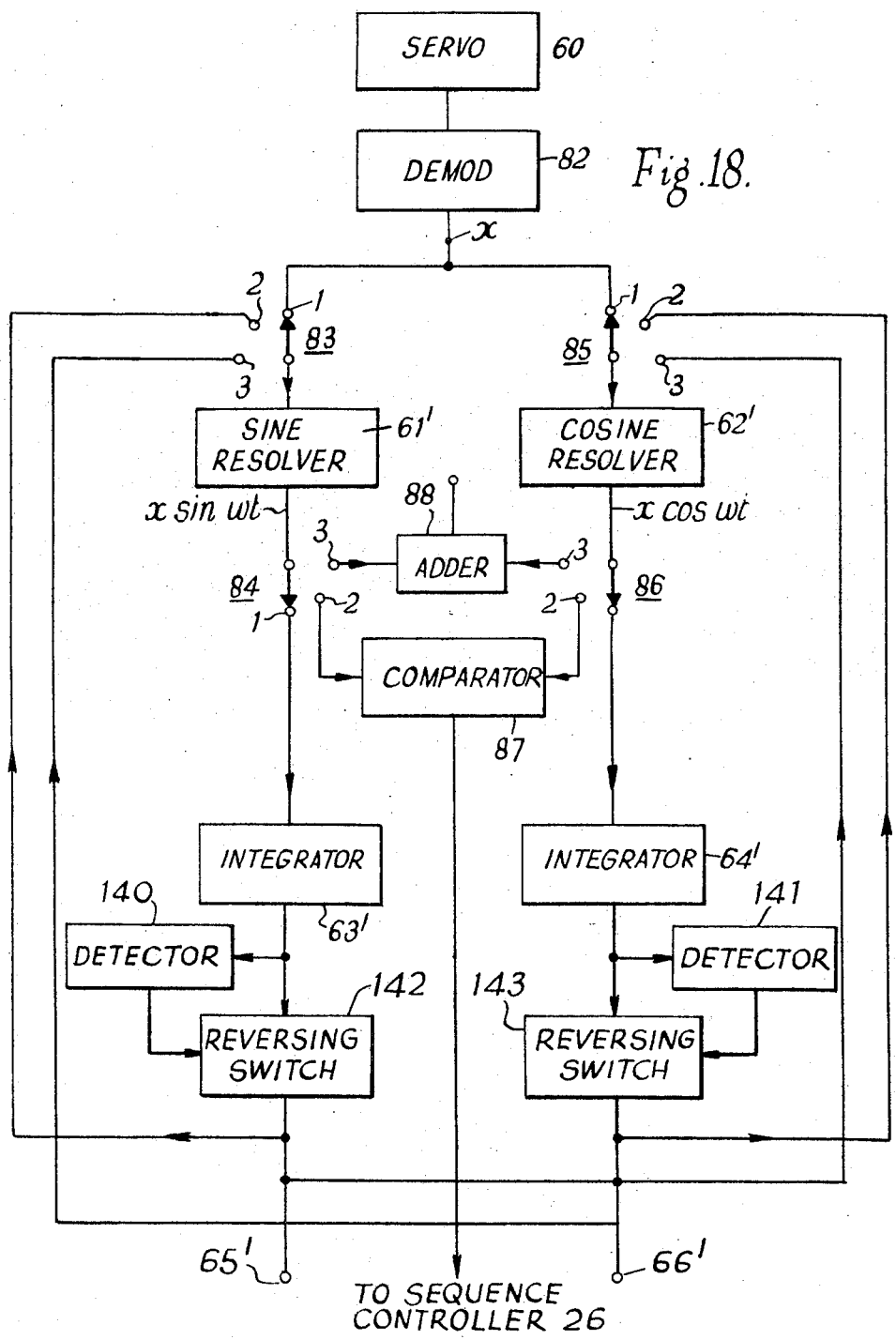
Figure 19:
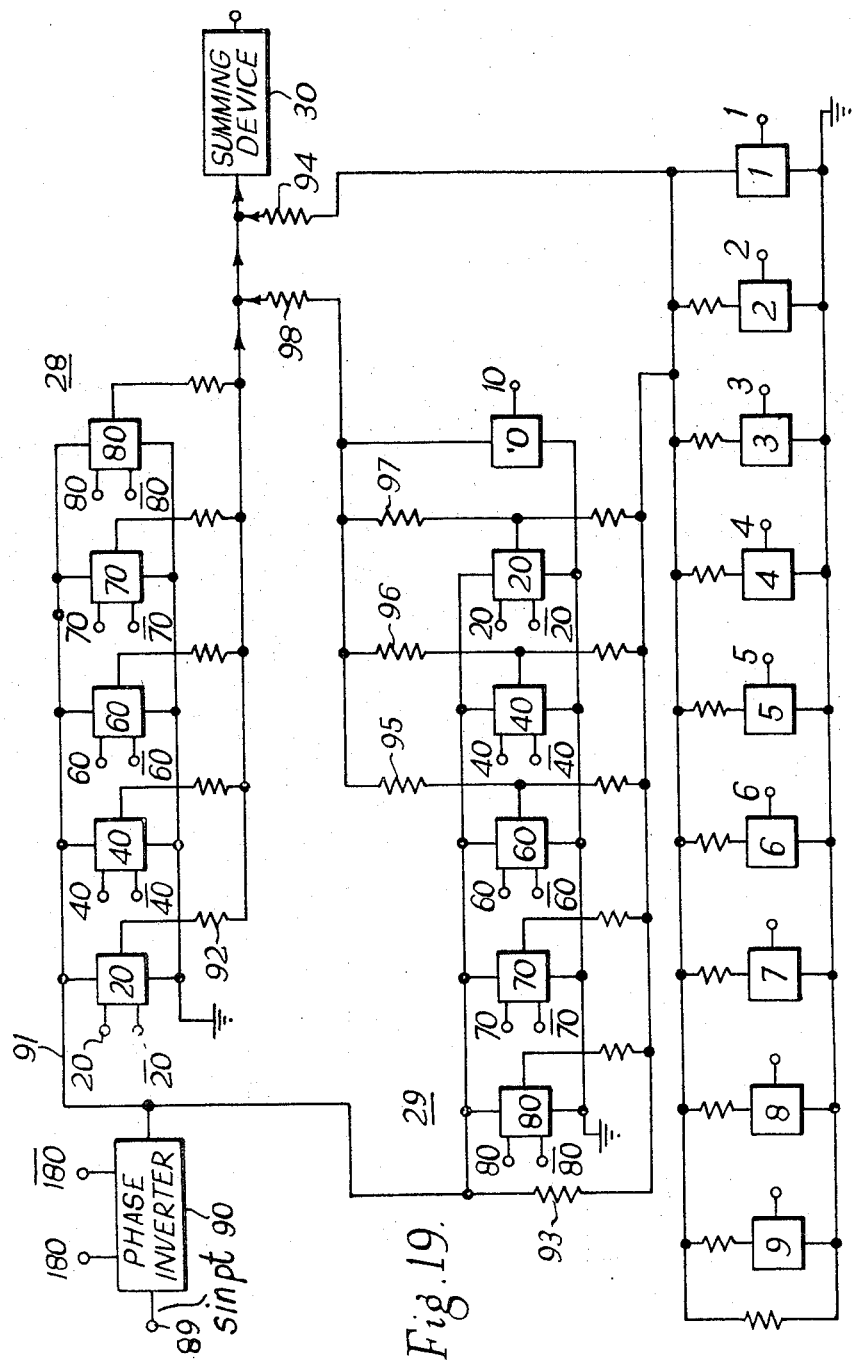
Figure 20:
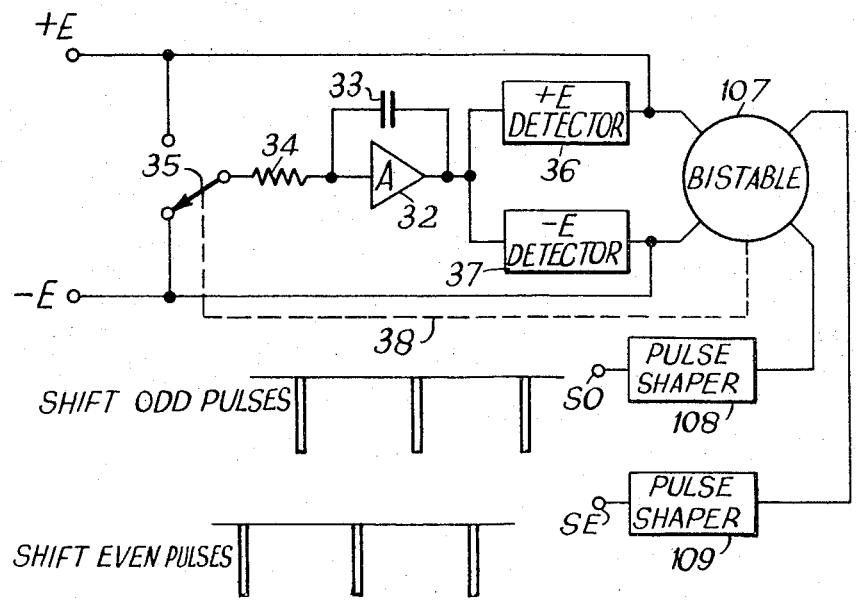
Figure 25:
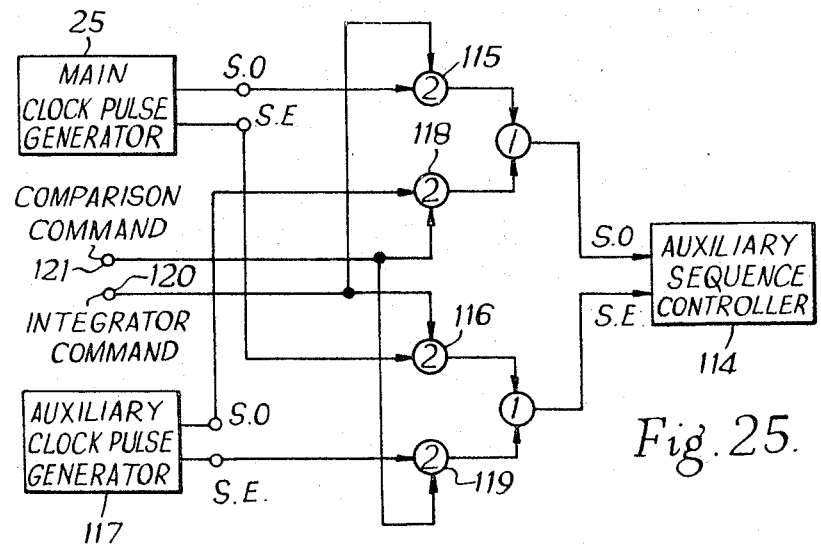
Figure 21A:
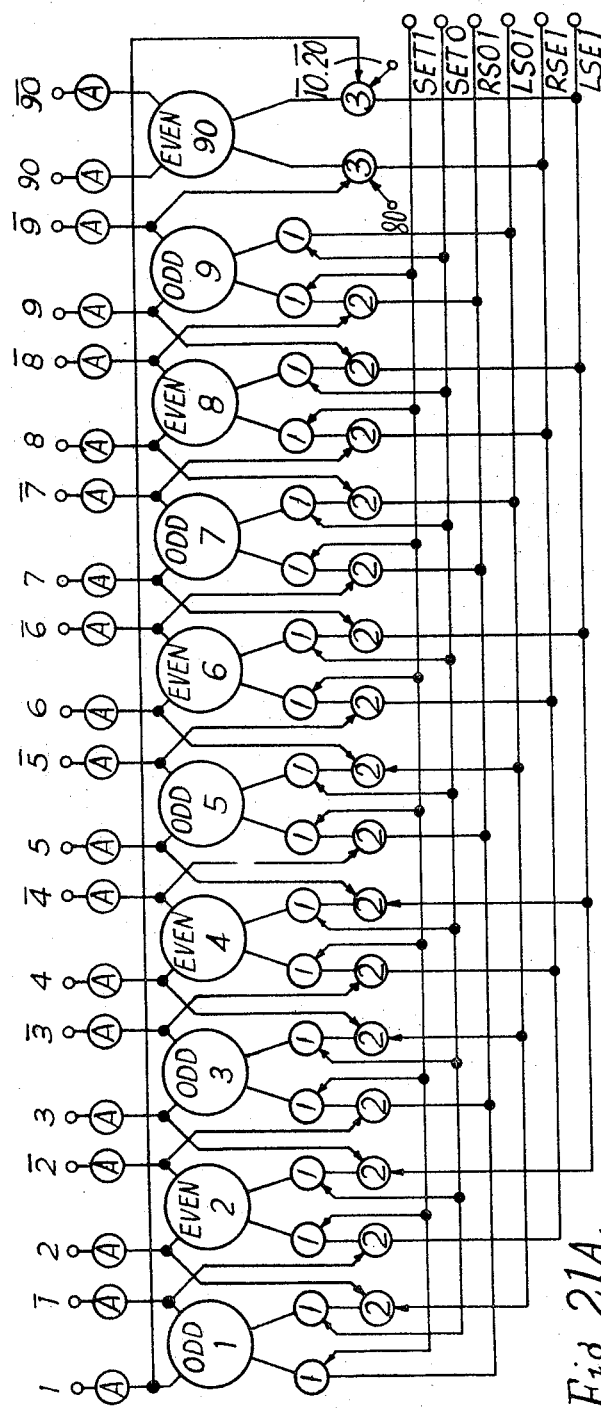
Figure 21B:
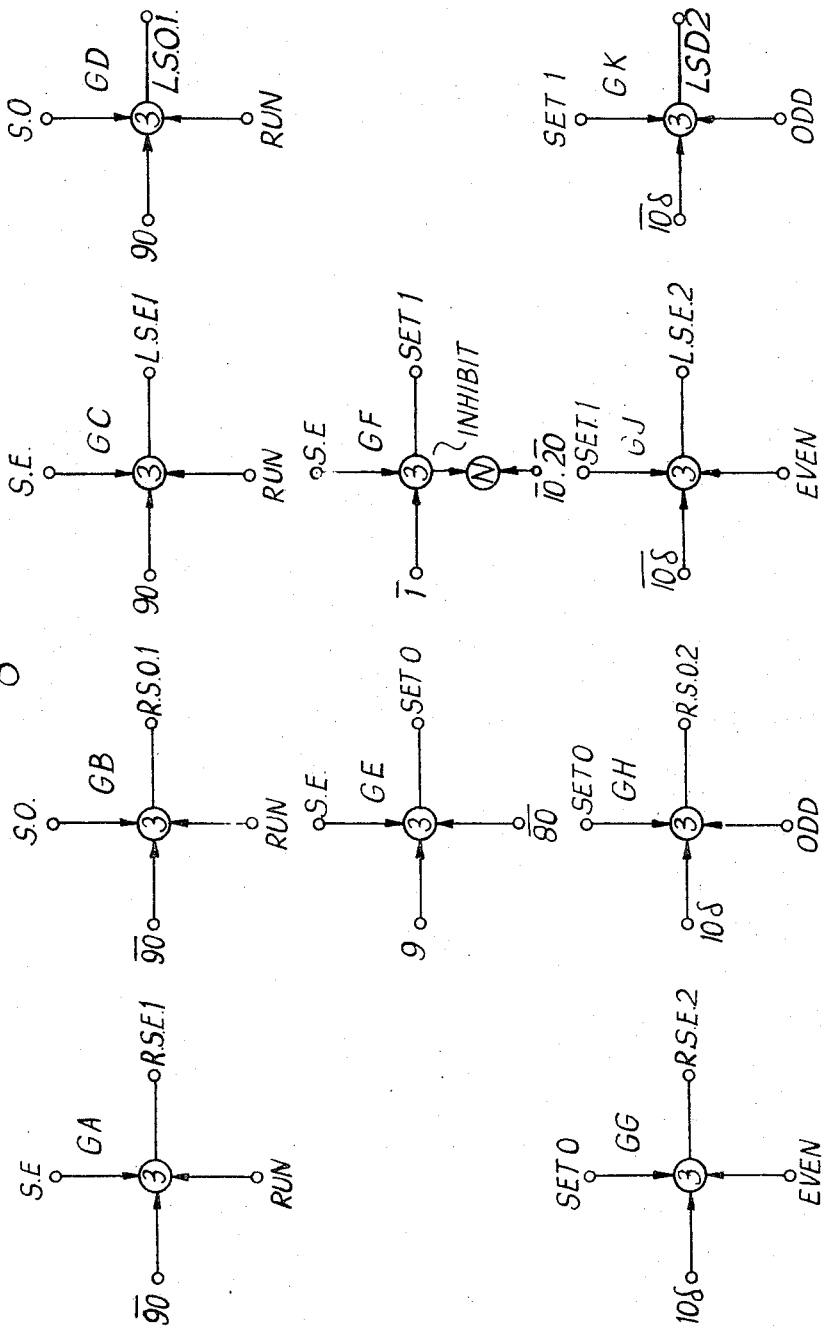
Figure 21D:
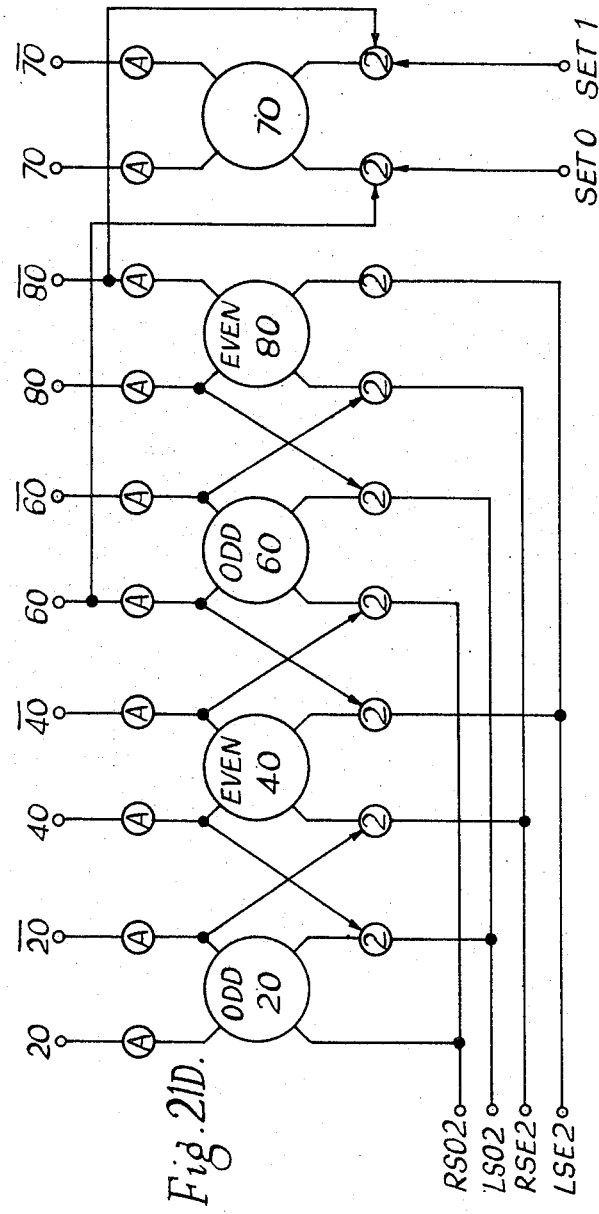
Figure 22:
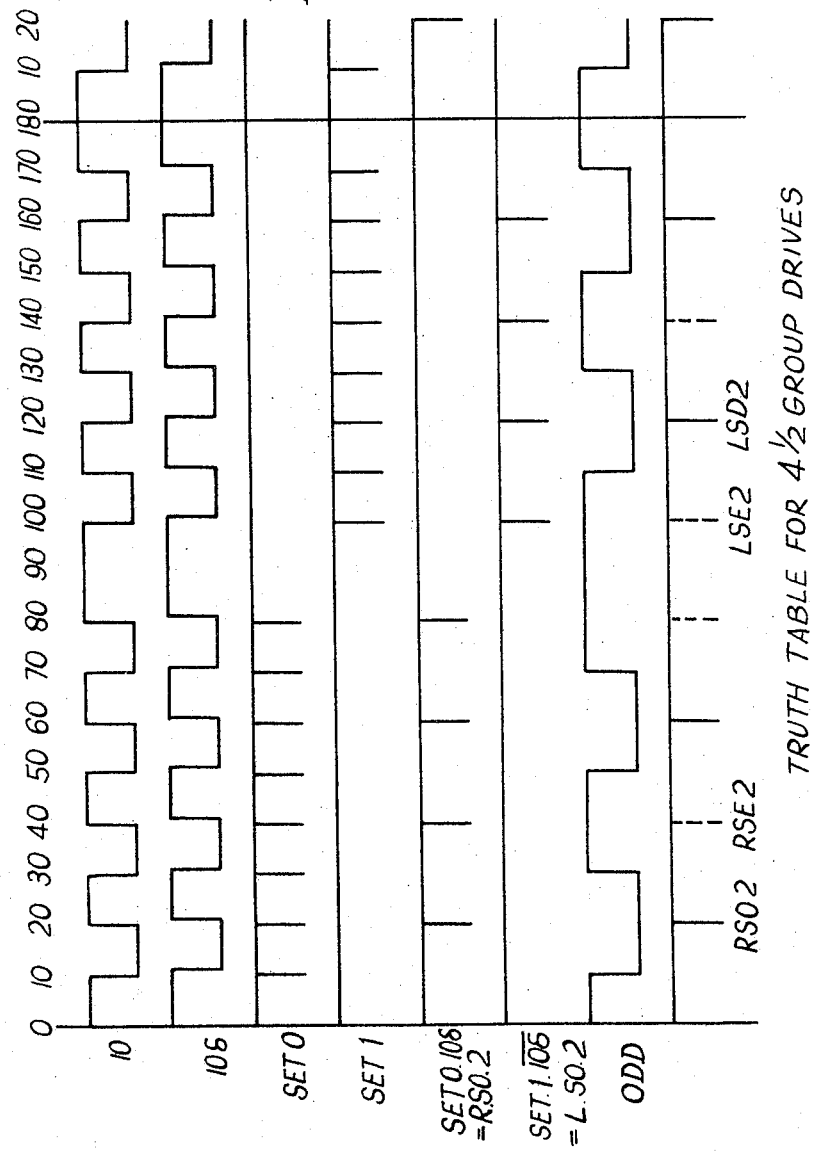
Figure 23:
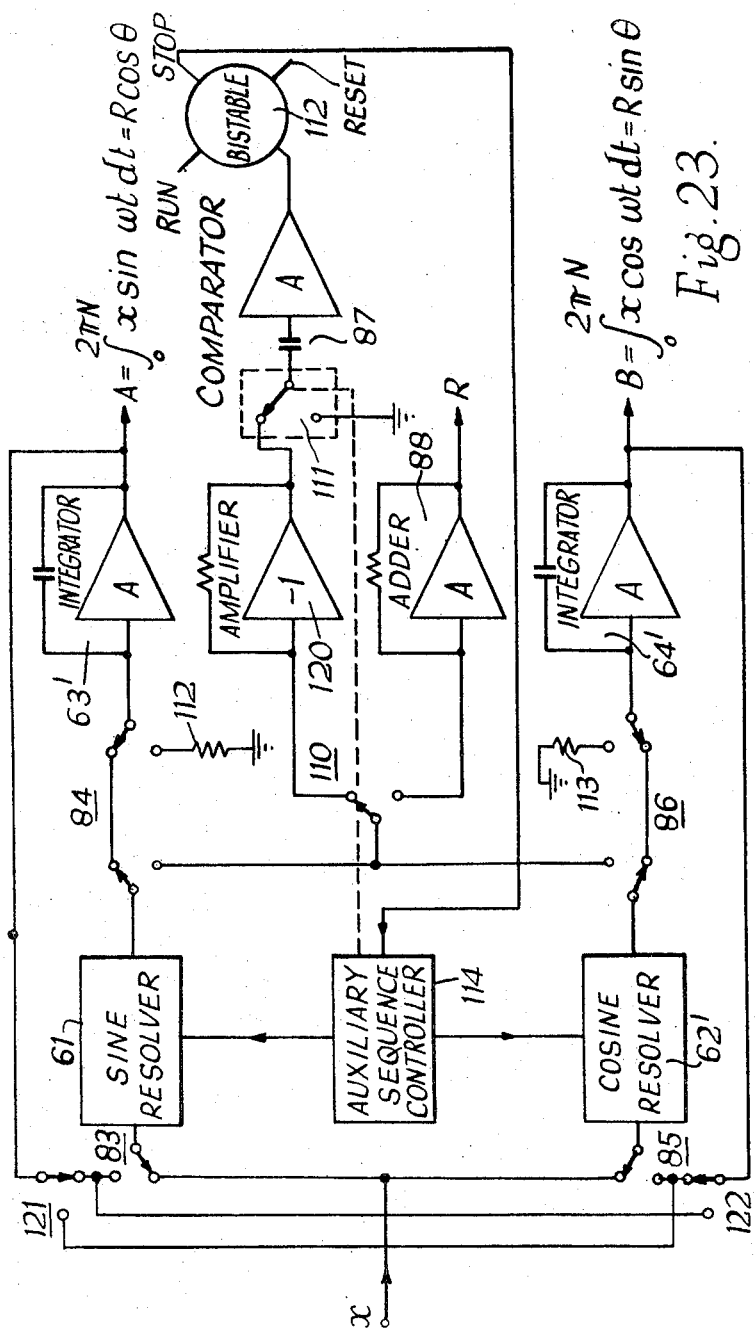
Figure 24:
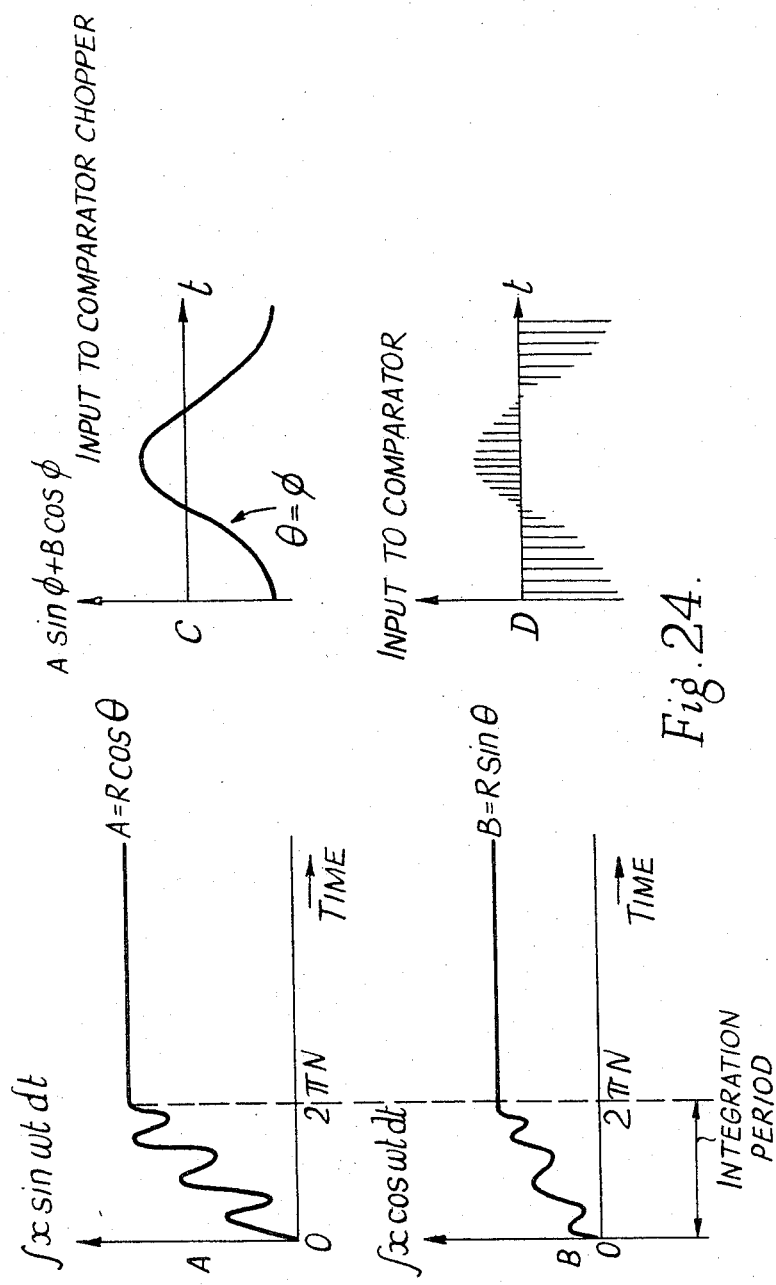

The invention will now be described, by way of example, with reference to the accompanying drawings, in which FIG. 1 is an explanatory diagram showing the synthesis of a sine wave from separate currents of rectangular and triangular form, FIG. 2 is a block diagram of apparatus for generating currents of rectangular and triangular form and for summing these currents to produce a sinusoidal oscillation, FIG. 2(a) is a schematic diagram of a triangular wave generator referred to as clock-pulse generator, FIG. 3 is a diagram of two sets of switches for producing currents of rectangular and triangular form, FIG. 4 is a schematic circuit diagram of apparatus for generating a wave of triangular waveform, FIGS. 5 and 6 are explanatory diagrams for use in describing the operation of the circuit in FIG. 4, FIGS. 7 and 8 are explanatory diagrams showing the relationship between currents of rectangular form and summation thereof, FIGS. 9 and 10 are explanatory diagrams showing the relationship between currents of triangular form and summation thereof, FIG. 11 is an explanatory diagram showing a further synthesis of a sine wave from separate currents of rectangular and triangular form, FIG. 12 is a block diagram showing an application of the oscillation generator of FIG. 2 to the testing of a servo, FIG. 13 is a block schematic diagram of apparatus for generating an oscillation in the form of an amplitude-modulated carrier, FIG. 14 shows a part of FIG. 13 in more detail, FIGS. 15 and 16 are explanatory wave form diagrams showing the waveforms of stepped-triangular currents generated by the apparatus shown in FIG. 14, FIG. 17 is a block diagram showing an application of the oscillation generator of FIG. 13 to the testing of a servo, FIG. 18 shows a modification of the apparatus shown in FIG. 17 whereby the output of the test apparatus indicating the result in cartesian co-ordinates can be converted into polar co-ordinates, FIG. 19 is a diagram of switches in a further embodiment of the invention, FIG. 20 is a diagram of a further clock-pulse generator, FIG. 21 (in four parts 21A, 21B, 21C and 21D) is a diagram of a sequence controller for controlling the sequence of operation of the switches in FIG. 19, FIG. 22 is a diagram of pulse waveforms produced by the controller of FIG. 21, FIG. 23 is a block diagram of apparatus for use in applying the embodiment of FIGS. 19, 20 and 21 to the testing of a servo, FIG. 24 shows waveforms present in the apparatus of FIG. 23, and FIG. 25 is a block diagram for use in conjunction with the diagram of FIG. 23.

Figure 26:
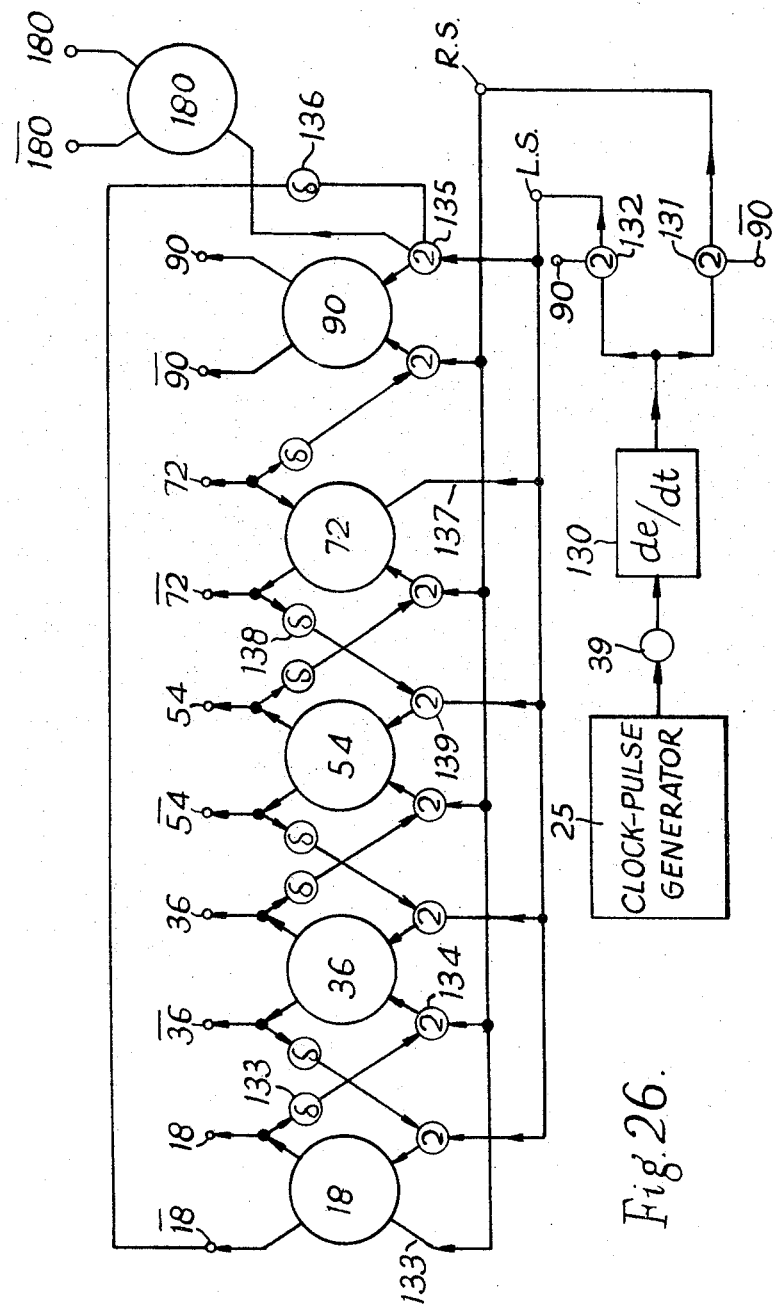

FIG. 26 is a block diagram of a sequence controller for use in the arrangement of FIG. 2.

Referring to FIG. 1, this shows one complete cycle of a wave 10 approximating a sine wave. It will be seen that the first half-cycle of this wave consists of four parts 11 to 14 of rectangular waveform, of progressively shorter durations and progressively smaller amplitudes, the four parts being symmetrical and added one on the other in the order given. In addition the first quarter-cycle has added thereto five parts 15 to 19 of triangular waveform of equal durations but progressively smaller amplitudes. The second quarter-cycle also has five further parts 20 to 24 identical in amplitude with the parts 19 to 15 respectively but with the slopes of the hypotenuses reversed.

The second half-cycle of the wave 10 is identical with the first half-cycle except, of course, that it is negative-going instead of positive-going.

Apparatus and its manner of operation for synthesising the wave 10 of FIG. 1 will now be described with reference to FIGS. 2 and 3.

In FIG. 2 a clock-pulse generator 25 is connected to a switching-sequence-control device 26 and to a triangular-waveform selector 27. The control device 26 is connected to two sets 28 and 29 of switches, the set 28 being adapted to generate currents of rectangular waveform and the set 29 being adapted to generate currents of triangular waveform. The selecting network 27 is adapted to select voltage pulses of triangular waveform for application to the set 29 of switches.

The currents provided by the sets 28 and 29 of switches are combined in a summing device 30 and provide a composite output at 31 in sinusoidal form.

Referring now to FIG. 2(a) this is a circuit diagram, in somewhat schematic form, of a known form of clock-pulse generator for use at 25 in FIG. 2. The clock-pulse generator comprises a Miller integrator including an amplifier 32 with a capacitor 33 connected between its output and input terminals and a resistor 34 connected between a switch 35 and the input terminal of the amplifier 32.

The switch 35 selects a voltage of +E volts or —E volts for application through the resistor 34 to the amplifier 32. Thus the integrator can generate a linear voltage ramp of positive or negative slope depending upon the setting of the switch 35.

Connected to the output of the amplifier 32 are two voltage detectors 36 and 37 which are also connected to the sources of +E volts and —E volts respectively. These two detectors are connected to the switch 35 as indicated by the broken line 38 and it is arranged that when a ramp of positive slope is being generated and reaches the value of +E volts the switch 35 is switched by the detector 36 from the setting shown to its other setting and the integrator proceeds to generate a ramp of negative slope. This proceeds until it reaches a value of —E volts when the switch 35 is restored by the detector 37 to the position shown and the integrator proceeds to generate a ramp of positive slope and so on.

Thus the waveform of the voltage appearing at the output of the switch 35 and applied to an output terminal 39 is of square waveform as shown at 40. The waveform of the voltage appearing at the output of the amplifier 32 and applied to an output terminal 41 is triangular as shown at P and is applied to the selector 27.

The output of square waveform 40 is used as clock pulses for application to the sequence controller 26.

Referring now to FIG. 3 this is a circuit diagram of the sets 28 and 29 of switches shown in block form in FIG. 2. In FIG. 3 the two sets of switches are shown within broken lines 28 and 29 corresponding to the blocks 28 and 29 of FIG. 2.

In the set 28 there are four switches 42 to 45 respectively each comprising two transistors such as the transistors 46 and 47 of the switch 42 with their emitter electrodes connected together and through a resistor such as the resistor 48 of the switch 42 to the summing device 30. The collector electrode of one transistor of each switch, such as the transistor 46 of the switch 42, is connected to a stabilised source 49 of D.C. and the collector electrode of the other transistor, such as 47, is earthed. The base electrodes of the transistors in the switches are connected to input terminals such as the input terminals 50 and 51, to which control voltages are applied from the sequence controller 26 of FIG. 2.

It will be appreciated that if such signals are applied to the base electrodes of the transistors 46 and 47 as render the transistor 46 heavily conducting and the transistor 47 substantially non-conducting the potential of the common emitter connection is substantially that of the D.C. source terminal 49. In this condition the switch 42 is "ON." Conversely when such signals are applied to the base electrodes of the transistors 46 and 47 as render the transistor 47 heavily conducting and the transistor 46 substantially non-conducting the potential of the common emitter connection is that of earth. In this condition the switch is "OFF." These switches are of a known kind in which the leakage current of either transistor when it is switched "OFF" passes through the other transistor.

When the switch 42 is "ON" the current flowing into the summing device 30 is determined principally by the resistance of the resistor 48 and the voltage of the D.C. source.

The remaining switches 43 to 45 in the seat 28 function in the same manner as the switch 42.

The set 29 of switches comprises five switches 52 and 56 identical with the switches in the set 28. The switches in the set 29, are, however, supplied with triangular pulses of voltage at a terminal 57 instead of stabilised D.C. whereby when a switch is "ON" the current it passes is of triangular waveform.

Referring now to FIG. 4 this is a block diagram showing the triangular-waveform selector 27 of FIG. 2 in more detail.

The voltage of triangular waveform P appearing at the output terminal 41 of the clock-pulse generator 25 is applied direct to a switch 58 and through an inverter 59 to a second switch 60, the inverted waveform being shown at Q. The outputs of both switches are applied to the common output terminal 57.

Referring again to FIG. 1, it will be seen that successive excursions of triangular waveform begin at a succession of regularly-recurring instants 0, 1, 2 . . . 10 in the first half-cycle. Furthermore each excursion of rectangular waveform has its leading and trailing edges coincident with the commencements of excursions of triangular waveform.

The waveforms P and Q are shown on the same time scale in FIG. 5. The instants 0 to 10 in FIG. 5 correspond to instants 0 to 10 in FIG. 1. It will be seen that the triangular shape of the waveform in FIG. 5 is isosceles whereas the waveform required is that of a right-angled triangle with the slope of the hypotenuse reversed at 90° in the sine wave 10.

The manner in which reversal is achieved will be seen from FIG. 6 which shows a waveform provided by switching from the Q waveform to the P waveform by means of the switches 58 and 60 controlled by the sequence controller 26. For the first five triangular sections the strokes of positive slope in the P and Q waveforms are selected and combined whereas in the second five triangular sections the strokes of negative slope in the P and Q waveforms are selected and combined. The waveform shown in FIG. 6 is that of the voltage applied to the terminal 57.

Referring now to FIG. 7 this shows at 11, 12, 13 and 14 four pulses of current of rectangular waveform provided by the four switches 42 and 45 respectively of FIG. 3, the same time scale being used throughout FIG. 7 and corresponding to the time scale of FIG. 1.

These pulses correspond to the rectangular sections 11 to 14 respectively in FIG. 1. The grading of the amplitudes of these pulses as shown is effected by variations in the resistances of the resistors such as the resistor 48 in FIG. 3 connected between the switches 42 to 45 and the summing device 30.

By summing the currents 11 to 14 of FIG. 7 the result is as shown in FIG. 8 which is on the same time scale as FIG. 7.

Referring to FIG. 9 this shows at 15 and 24 pulses of current passed by the switch 52 of FIG. 3; at 16 and 23 pulses passed by the switch 53; at 17 and 22 pulses passed by the switch 54; at 18 and 21 pulses passed by the switch 55; and at 19 and 20 pulses (constituting a single pulse) passed by the switch 56. Throughout FIG. 9 the same time scale is used and corresponds to the time scale of FIG. 1. The pulses 15 to 24 correspond to the triangular sections 15 to 24 in FIG. 1.

The grading of the amplitudes of these pulses as shown is accomplished by varying the resistances of the resistors connecting the switches 52 to 56 to the summing device 30.

By summing the current pulses of FIG. 9 the result is as shown in FIG. 10 which is on the same time scale as FIG. 9.

By summing the waveforms of FIGS. 8 and 10 in the summing device 30 the waveform of FIG. 1 (to the instant 10) is produced.

It will be appreciated that instead of maintaining each of the switches 42 to 45 switched "ON" to provide the pulses as shown in FIG. 7 which, when added, would produce the waveform of FIG. 8, each switch could be switched "ON" for only one of the clock-pulse time intervals in the same way as the switches in the set 29. It would be necessary, of course, to grade the resistances of the resistors connecting the switches 42 to 45 to the summing device appropriately.

It will be appreciated from the foregoing description that the sequence controller 26 can readily be engineered in the form of a number of bi-stable devices arranged as counters such as ring-counters and provided with suitable outputs to the sets of switches and to the waveform-selector 27. One example of a suitable sequence controller will, however, be described for completeness with reference to FIG. 26.

In FIG. 26 the clock-pulse generator 25 with an output terminal 39 corresponds to the generator 25 and output terminal 39 shown in FIG. 2(a).

The clock-pulses are equally spaced at intervals corresponding to 18°-steps in the sinewave to be synthesised. The square pulses appearing at the terminal 39 are differentiated and rectified by a half-wave rectifier in a differentiating unit 130 and passed to gates 131 and 132 respectively provided with control terminals marked $\overline{90}$ and 90 and output terminals RS and LS respectively.

Five counters marked 18, 36, 54, 72 and 90 corresponding to five 18°-steps in 90° of a sine wave are arranged as shown.

Each counter has two outputs marked with the same reference as the counter with the exception that one output reference has a bar over it such as in $\overline{18}$. The bar indicates logical "NOT" and whenever a counter is switched off voltage appears at its barred output but not at its unbarred output. Whenever a counter is switched on voltage appears at its unbarred output but none appears at its barred output. The terminals 90 and $\overline{90}$ associated with the gates 132 and 131 respectively are to be considered to be connected to the outputs 90 and $\overline{90}$ on the counter 90 the actual connections having been omitted to save complication in the drawing.

It will be assumed that the five counters in FIG. 26 are all initially switched off whereby outputs appear at the terminals $\overline{18}, \overline{36}, \overline{54}, \overline{72}$ and $\overline{90}$ but not at the terminals 18, 36, 54, 72 and 90. Thus the gate 131 generates a pulse in its output whenever a pulse is applied to the gate 131 and hence pulses appear at the terminal RS but not at the terminal LS. The reference RS is to indicate that pulses for right-shift are applied, that is for switching on the counters 18 to 90 progressively proceeding from left to right in the drawing. Similarly the reference LS is to indicate that pulses for left-shift are applied.

The first pulse to appear at RS after the commencement of a cycle is a pulse corresponding to 18°. This pulse passes through a connection 133 to the counter 18 which is thereby switched on. Thus output now appears at the terminal 18 and is removed from the terminal $\overline{18}$. Furthermore after a short delay in a delay device the output at the terminal 18 is also applied to a right-shift gate in an input circuit to the counter 36. This so conditions the gate 134 as to pass the next right-shift pulse appearing at the terminal RS and corresponding to 36° to an input circuit of the counter 36. This switches on the counter 36 whereby output is removed from the terminal $\overline{36}$ and appears on the terminal 36.

Like operations occur to switch on the counters 54 and 72 in response to the next two right-shift pulses from RS.

The fifth right-shift pulse likewise switches on the counter 90 whereby the gate 131 can then pass pulses to the terminal LS whereas the gate 132 becomes inhibited.

A left-shift gate 135 in an input circuit of the counter 90 has one input thereto from a delay device 136 to which the output terminal 18 is connected. Thus with the counter 18 switched on output is removed from the terminal $\overline{18}$ and the gate 135 is inhibited. Thus after the counter 90 is switched on by the fifth right-shift pulse it remains on during the next five left-shift pulses when the counters 72 to 18 proceeding from right to left in the drawing are progressively switched off by the left-shift pulses.

The left-shift input to the counter 72 is direct from the terminal RS through a connection 137 that is without an intervening gate. Thus the first left-shift pulse switches off the counter 72 whereby output is removed from the terminal 72 and output appears on the terminal $\overline{72}$. The output at $\overline{72}$ is applied after a short delay in a delay device 138 to a left-shift gate 139 in the left-shift input to the counter 54 whereby the gate 139 is conditioned to pass a pulse to the left-shift input of the counter 54 to switch this counter off when the second left-shift pulse occurs. Similarly the counters 36 and 18 are switched off by the next succeeding two left-shift pulses respectively.

The next left-shift that is the fifth left-shift pulse passes through the gate 135 now conditioned by the output from $\overline{18}$ and switches off the counter 90. At the same time this pulse is passed to a counter $\overline{180}$ with outputs $\overline{180}$ and 180 and switches it on. Thus during the first ten pulses (five right-shift and five left-shift), corresponding to the first 180° of the sine wave, the output appears at $\overline{180}$ but none at 180. During the next ten pulses (five right-shift and five left-shift) output appears at 180 but not at $\overline{180}$. The outputs at 180 and $\overline{180}$ are used appropriately to reverse the polarity of the inputs to the switches 28 and 29 during the second half-cycle of each cycle of the sine wave.

Switching voltages for use in controlling the switches of the sets 28 and 29 of FIG. 2 and FIG. 3 are derived from the terminals 18, 36, 54, 72, 90, $\overline{180}$ and 180 to synthesize a sine wave. For cosine operation which is referred to later outputs are derived from the terminals $\overline{18}, \overline{36}, \overline{54}, \overline{72}, \overline{90}, \overline{180}$ and 180.

The frequency of the generated voltage of sine waveform is controlled exclusively by the clock-pulse generator, the amplitude of the generated voltage can be accurately controlled by stabilising supply voltages and using stable resistors and the waveform can be accurately controlled by appropriate selection of resistance values.

Thus the construction of the generator to meet the requirements previously referred to is facilitated.

Turning now to FIG. 11, this illustrates an alternative method of synthesising a sine wave by means of the present invention.

In FIG. 11, unlike FIG. 1 the first half-cycle is synthesised from ten triangular portions and five rectangular portions instead of four. In addition it is arranged that the current of triangular waveform has a mean value of zero as shown by the curve in broken lines in FIG. 11, whereas in FIG. 1 the mean value is half the amplitude. It will also be seen that in FIG. 11 the first rectangular part has its leading and trailing edges at the instants 0 and 10, the second rectangular part has its leading and trailing edges at the instants 1 and 9 and so on.

The switching necessary to build up the waveform of FIG. 11 in the manner just described can be achieved with the circuits of FIGS. 2 and 3 by adding an extra switch in the set 28 of FIG. 3 and controlling the two sets of switches appropriately.

For example an extra counter can be added before the counter 18 in FIG. 26 to operate at 0° and used to operate the additional switches in the sets 28 and 29.

Because of the accuracy with which the sine waves of FIGS. 1 and 11 can be generated as to waveform, frequency and amplitude over a wide range of frequencies, the apparatus and method described are particularly suitable for use in a transfer function analyser for testing the performance of servo mechanisms and other devices and circuits.

For use in comparing the output of apparatus such as servo mechanisms with a signal applied thereto and generated as hereinbefore described apparatus has been devised and will now be described.

Referring to FIG. 12 this shows the sine wave generator of FIG. 2 connected to servo mechanism 60. The output $x$ of the servo mechanism is applied to two resolvers 61 and 62 for providing outputs representative of $x \sin \omega t$ and $x \cos \omega t$ respectively. These outputs are integrated in two integrators 63 and 64 respectively over N complete cycles to provide outputs representative of $$\int_0^{2\pi N} X \sin \omega t \text{ and } \int_0^{2\pi N} X \cos \omega t \text{ respectively}$$

In this way outputs suitable for indicating the in-phase and quadrature components of $x$ are provided at terminals 65 and 66.

Alternatively, and particularly when high frequencies are used, the integration may be effected by continuous averaging over a period which is sufficiently long for the outputs to reach a steady state.

The apparatus for use as the sine resolver at 61 can be identical with the set 28 of switches in FIG. 3 the stabilised D.C. supply at the terminal 49 being replaced by the output $x$ of the servo 60. The apparatus for use as the cosine resolver at 62 can be identical with the set 28 of switches in FIG. 2, the stabilised D.C. supply at the terminal 49 being replaced by $x$ and the switches 42 to 45 controlled appropriately for the cosine phase, this from the outputs $\overline{18}$, $\overline{36}$, $\overline{54}$, $\overline{72}$ and $\overline{90}$ in FIG. 26.

The apparatus as so far described is suitable for many applications in the testing of servo mechanisms and the like but is not entirely satisfactory when tests are to be made with an amplitude-modulated carrier oscillation. For example one or more linear modulators would have to be used which introduces difficulties in design and construction.

In accordance with the invention, however, an oscillatory carrier current, amplitude-modulated with an oscillation of predetermined waveform, frequency and amplitude can be synthesised without the need to generate a modulating oscillation of the given waveform frequency, and amplitude, and then to apply it to modulate an oscillatory carrier current.

One embodiment in accordance with this aspect will be described with reference to FIGS. 13 to 16.

Referring initially to FIG. 13 the apparatus for generating a signal in the form of sin $pt$ sin $\omega t$ where sin $pt$ represents a carrier oscillation is shown in block form. In FIGS. 2 and 13 like parts have the same reference.

The clock-pulse generator is connected through the sequence controller 26 to the sets 28 and 29 of switches as before and the outputs of these two sets of switches are applied to the summing device 30 providing an output at the terminal 31.

The difference dies in that instead of D.C. being applied to the terminal 49 a carrier oscillation is applied from a source 67, and instead of the voltage of triangular waveform being applied to the terminal 57 the carrier is applied modulated by a voltage of stepped triangular waveform derived by a unit 68.

It will be understood that when each switch in the set 28 is switched "ON" the carrier oscillation is transmitted therethrough to the summing amplifier, the amplitude of the carrier being constant and being determined by the amplitude of the carrier applied from the source and by the resistance of the resistor connecting the switch to the summing amplifier.

Referring to the unit 68 for modulating the carrier with a signal of stepped triangular waveform a more detailed circuit diagram of this unit is shown in FIG. 14. In this embodiment the clock-pulses generated by the generator 25 instead of being representative of 18°-steps are representative of 1°-steps and are applied from the terminal 39 to an 18°-stage counter 69. The pulses in each series of eighteen during the first 90° switch on the stages of the counter progressively until all are switched on. The next pulse resets the counter to zero to begin the next count.

The eighteen stages of the counter are connected to eighteen switches respectively of which the first and last are shown at 70 and 71. A carrier oscillation (sin $pt$) is applied to all the switches 70–71 from an input terminal 72 and the outputs of the switches are applied through eighteen resistors respectively of which two are shown at 73 and 74 to a summing device 75 provided with an output terminal 57 corresponding to 57 in FIG. 13. The resistances of the resistors 73–74 are made such that the amplitude of the current in the output of the summing device increases in equal steps to the maximum and then flies back to zero.

Thus referring to FIG. 15 the magnitude of the carrier oscillation can be represented as varying as shown by a stepped line 81 there being 18 steps in the interval 0–1 which corresponds to the interval 0–1 in FIG. 1. Two successive triangles are shown in FIG. 16. It will be understood of course that when the slope of the stepped hypotenuse is required to be negative for the second quadrant the switching order is reversed, that is all switches are initially switched "ON" and are switched "OFF" in turn. At 180° the half-cycle is repeated with the phase of the carrier oscillation inverted.

The output of the final stage of the counter 69 of FIG. 14 is also applied to a differentiating circuit 130 corresponding to the differentiating circuit 130 of FIG. 26 whereby one pulse every 18° is provided and is used as described with reference to FIG. 26 to control the counters 18, 36, 54, 72 and 90. Thus the sets 28 and 29 of switches in FIG. 13 are sequenced in the same manner as in FIGS. 2 and 3.

Thus the arrangement of FIG. 13 generates a test signal which is a carrier function of sin $\omega t$ and can be represented by sin $pt$ sin $\omega t$.

The generator shown in FIG. 13 can be used for testing servo mechanisms and the like in an analogous manner to that described with reference to FIG. 12. A block diagram illustrating this is shown in FIG. 17.

In this figure, however, a demodulator 82 is connected between the output of the servo 60 and the sine and cosine resolvers 61' and 62' to demodulate the carrier oscillation. In addition this aspect of the invention enables the sine and cosine resolvers to be identical in structure with the generator of FIG. 13. Thus the transfer function analyser consists of two identical units functioning as the generator and sine resolver, a third unit identical with the sine resolver with the exception of the resistors connecting the switches to the summing device which are graded to function as a cosine resolver, plus a demodulator (82) and two integrators (63' and 64').

Furthermore this aspect of the invention readily enables the results of an analysis to be given in polar co-ordinates instead of or in addition to cartesian co-ordinates.

The modification for enabling this to be effected is shown in FIG. 18 and will be seen to include switches 83 and 84 in the input and output circuits of the resolver 61' and switches 85 and 86 in the input and output circuits of the resolver 62'.

Each switch is a three-position switch and all four switches are initially set to position 1 to provide the outputs from the integrators 63' and 64' as previously described.

The switches are then set to position 2 whereby the output of each integrator is connected to the input of its associated resolver, the servo mechanism is disconnected from the resolvers and the outputs of the resolvers are connected to a comparator 87.

The sequence controller 26 is then switched on to function in the manner already described until the comparator provides a signal indicating equality of the outputs of the two resolvers. This signal is applied to the sequence controller as indicated by the arrow to arrest operation of the sequence controller 26 at this point, for example by inhibiting a gate through which clock-pulses are applied to the sequence controller.

The condition of the resolvers at this point represents the angle $\theta$ required to express the result of the test in polar co-ordinates. $\theta$ is determined from the sequence controller 26 which is arrested in a condition corresponding to $\theta$ that is, the counters in the on condition indicate $\theta$. For example if counter 18 (FIG. 26) is on but the rest are off and in the counter 69 (FIG. 14) ten stages are on but the rest are off, the angle $\theta$ is $(18+10)°$, i.e. 28°. All that remains is to determine R (the amplitude of the output) to complete the conversion to polar co-ordinates.

To achieve this the switches 83 to 86 are all set to positions 3 whereby the outputs of the integrators 63' and 64' are applied as supply voltage to the inputs of the resolvers 62' and 61' respectively, in other words the connections are reversed.

Thus if the outputs of the integrators 63' and 61' are referred to as A and B respectively, the outputs of the resolvers with the switches 83 to 86 in position 3 are representative of $B \sin \theta$ and $A \cos \theta$ respectively.

As $A = R \cos \theta$ and $B = R \sin \theta$, the outputs of the resolvers are representative of $$R \sin \theta \sin \theta = R \sin^2 \theta$$

and $$R \cos \theta \cos \theta = R \cos^2 \theta$$

The outputs of the resolvers with the switches 83 to 86 in position 3 are applied to an adder 88 and hence the output of the adder is representative of $$R \sin^2 \theta + R \cos^2 \theta = R(\sin^2 \theta + \cos^2 \theta) = R$$

Thus R and $\theta$ are determined respectively from the output of the adder 88 and the setting of the sequence controller 26.

The foregoing description of the conversion from cartesian to polar co-ordinates is based on the assumption that $\theta$ lies between 0° and 90°. To enable conversion to be effected in all four quadrants of 360° two polarity detectors 140 and 141 are provided at the output of the integrators 63' and 64' respectively and the detectors are connected to polarity-reversing switches 142 and 143 in the outputs as shown.

It is arranged that when A is positive no action is taken by the detector, but when A is negative the polarity of the output is reversed and the fact that this has been done is stored in the switch setting.

The detector and switch for use with the output B functions in like manner. In reading $\theta$ the states of the switches associated with these detectors are taken into account.

As $\theta$ is quantised a digital display connected to the sequence controller can conveniently be used to indicate $\theta$. A digital voltmeter can be used to indicate R.

Although the switches in FIG. 18 are illustrated as mechanical switches they can be electronic switches controlled by the sequence controller.

Thus the sequence controller can be set to function for normal generation and correlation for a selected whole number N of cycles and then automatically to carry out the two sequential switching operations described with reference to FIG. 18 thereby providing the result of the analysis in polar co-ordinates. It can, of course, be arranged to provide a manually-operable switch whereby the automatic sequential switching operations are inhibited leaving the result of the analysis in cartesian co-ordinates.

Furthermore an additional manually-operable switch can be provided whereby the carrier generator can be switched off, a D.C. source connected in its place and the demodulator by-passed. The transfer function analyser can then be used to carry out an analysis with direct signals, i.e. with out a carrier.

Referring now to FIGS. 19 to 22 these show a second embodiment of the invention for generating an oscillation in the form of $\sin pt \sin \omega t$.

This embodiment is basically of the same nature as that described with reference to FIGS. 13–16 but uses (a) stepped triangular waveforms of 20 or 10 steps depending upon location in the waveform of the generated sinusoidal oscillation, (b) a sequence controller of simplified form and such that operating speeds can be increased and (c) a modified clock-pulse generator.

Referring to FIG. 19 the set 28 of switches for generating the rectangular pulses of carrier current consists of five switches with the references 20, 40, 60, 70 and 80 respectively.

The set 29 of switches for generating the stepped triangular pulses of carrier current consists of two groups of switches one group consisting of six switches with the references 10, 20, 40, 60, 70 and 80 respectively, and the other group consisting of nine switches with the references 1 to 9 respectively.

The carrier oscillation $\sin pt$ is applied through an input terminal 89 to a phase inverter 90 controlled by the sequence controller connected to the terminals 180 and $\overline{180}$. Throughout the description of this embodiment and in the drawings relating thereto a bar over a number is used to indicate logical "NOT."

The sequence controller is arranged to apply a control signal to the terminal $\overline{180}$ throughout the first 180° of each cycle of oscillation generated. The phase inverter 90 in response to this signal does not invert the phase. During the second 180° of each generated cycle of oscillation the sequence controller applies a signal to the terminal 180 in response to which the phase inverter inverts the phase of the carrier transmitted therethrough. This can be achieved in any suitable manner for example by switching in a phase inverting amplifier stage of unit gain.

The output of the phase inverter appears in a conductor 91 connected to the two sets of switches.

Referring initially to the set 28 of switches these are each in the form shown in FIG. 3 and can select earth or the conductor 91. The switches are connected through individual output resistors such as the resistor 92 in the output of the switch 20 to the summing device 30.

At first all the switches in this set are arranged to select earth and hence no output is provided to the summing device 30. On the occurrence of the 20th clock-pulse the switch 20 receives a pulse on the terminal 20 from the sequence controller which causes the switch 20 to select the conductor 91 and supply carrier current to the summing device. Similarly on the occurrence of the 40th, 60th, 70th and 80th clock-pulses the switches 40, 60, 70 and 80 are switched by the sequence controller to select the conductor 91 for connection to the summing device.

The sequence controller holds the switches in these settings until the 100th clock-pulse when the switch 80 is switched to select earth. Similarly the switches 70, 60, 40 and 20 are switched to select earth by the 110th, 120th, 140th and 160th clock-pulses respectively.

This sequence is repeated for the second half of the cycle with the phase of the carrier reversed as described.

Referring now to the set 29 of switches, switches 1 to 9 and 10 are simple gates such as a transistor and are all initially closed whereby no carrier current is passed from the set 29 to the summing device. At this time the switches 20, 40, 60, 70 and 80 of the set 29 (which are identical with the switches of the same references in the set 28) are set to select the conductor 91.

The first nine clock-pulses are arranged by the sequence controller to open the switches 1 to 9 respectively whereby the supply of carrier current to the summing device via the resistors 93 and 94 increases in steps—one step per clock-pulse.

When the tenth clock-pulse occurs the sequence controller is arranged to open the switch 10 and close all the switches 1 to 9. The current supplied through the switches 20, 40 and 60 and resistors 95 to 98 is arranged to equal the current supplied with all the switches 1 to 9 open and with 10 closed.

Thus when the switches 1 to 9 are progressively opened by the 11th to the 19th clock-pulses the steps continue. On the 20th pulse the switch 10 is closed, the switch 20 is set to select earth and the switches 1 to 9 are closed. Thus the output from the set 29 of switches falls to zero and the first triangular pulse of 20 steps on the hypotenuse has been generated.

This sequence is repeated for the next two groups of 20 pulses each with the switches 40 and 60 being set to select earth on the occurrence of the 40th and 60th pulses.

Thereafter the switch 10 is of no effect on the feed through the resistors 95, 96 and 97 since the three switches 20, 40 and 60 are all set to select earth.

The feed to the switches 1 to 9 is then solely through the resistor 93 and whichever of the switches 70 and 80 are set to select the conductor 91. Thus the next three stepped-triangular pulses over the angle from 60° to 90° are of ten steps each.

The amplitude of the steps in the first of these three triangular pulses is governed by the current flowing through the switches 70 and 80 added to that flowing through the resistor 93.

On the occurrence of the 70th pulse the switch 70 selects earth and hence the amplitude of the steps in the second of these three triangular pulses is reduced.

Similarly on the occurrence of the 80th clock-pulse the switch 80 selects earth whereby the third of these three triangular pulses is of the minimum amplitude.

This grading of the triangular pulses is arranged to match the grading of the rectangular pulses produced by the set 28 of switches.

From 90° to 180° the sequence just described is reversed and at 180° the entire cycle is repeated with the phase of the carrier current inverted.

Referring now to FIG. 20 this shows the modified clock-pulse generator. As in the pulse generator shown in FIG. 2(a) there is provided a Miller integrator having an amplifier 32, a feedback capacitor 33 and in input resistor 34 connected to a switch 35 whereby $+E$ or $-E$ volts can be selected for application to the Miller integrator. Likewise detectors 36 and 37 are provided to determine when $+E$ volts and $-E$ volts have been reached in the positive and negative ramps.

The outputs of the detectors 36 and 37 are applied to control a bi-stable circuit 107 which is connected to control the switch 35. In addition two outputs are provided by the bi-stable circuit which are shaped by pulse shapers 108 and 109 to provide sharp pulses at output terminals SO and SE respectively. Representations of these pulses (hereinafter referred to as the shift odd and shift even pulses) are shown alongside the terminals SO and SE. It will be seen that the shift even pulses are interlaced with the shift odd pulses. The recurrence period of the pulses in each of these trains is equal to the time interval 2° in the oscillation to be produced.

Referring now to FIG. 21 this shows the sequence controller and is divided into four parts 21A, 21B, 21C and 21D for convenience in drawings. Throughout these drawings terminals of like reference are to be considered connected together.

FIG. 21A shows ten counters 1 to 9 and 90. FIG. 21D shows five counters 20, 40, 60, 70 and 80. These two groups of counters are controlled by pulse gates of which some are shown in FIG. 21B and the others in FIG. 21C.

It will be assumed that all counters are initially set to zero. The "RUN" switch of the gate GS is closed whereby the gates GA and GB are made active. The first shift odd pulse passes through the gate GB and actuates the counter 1 in FIG. 21A. The next shift even pulse passes through the gate GA and actuates the counter 2. This sequence proceeds until all gates 1 to 9 are set.

Bi-stable 9 conditions a gate GE whereby the 10th pulse (5th even pulse) passes through the gate GE and resets all the counters 1 to 9 to zero. This same pulse (set 0) also sets the bi-stable 10 (FIG. 21C).

The 11th to the 19th shift pulses are counted in like manner in the counters 1 to 9. The 20th pulse passes through the gate GE and resets all counters 1 to 9 again to zero. This same pulse (set 0) appearing in the output of the gate GE resets the bi-stable 10.

The bi-stable 10 has four output terminals marked 10, $\overline{10}$, 10δ and $\overline{10δ}$. Outputs appear on terminals 10 and $\overline{10}$ immediately upon actuation of the bi-stable whereas the outputs on the terminals 10δ and $\overline{10δ}$ are delayed.

Thus on the occurrence of the set 0 pulse the output 10δ is still present and hence the set 0 pulse is passed by the gate GH and sets the counter 20 (FIG. 21D). The pulse for terminal "ODD" of the gate GH is provided by the "ODD-EVEN" bi-stable $O/E$ (FIG. 21C).

This sequence is repeated for the next 40 shift pulses the counters 40 and 60 being set at the 40th and 60th pulses. The next nine shift pulses set counters 1 to 9 and on the 70th shift pulse the counter 70 (FIG. 21D) is set by the set 0 pulse passing through the 2-gate conditioned by the output at 60 from the counter 60. The bi-stable 10 is also set but is of no effect. The counters 1 to 9 are reset to zero as before by the set 0 pulse.

The next nine pulses set the counters 1 to 9 and on the 80th pulse the counter 80 (FIG. 21D) is set by the set 0 pulse passed by the gate GG. The bi-stable 10 is reset but again is of no effect. The counters 1 to 9 are reset to zero and the next nine pulses to the 89th set the counters 1 to 9. The counter 90 (FIG. 21A) is conditioned by the counter 80 (FIG. 21D) and the 90th pulse sets the counter 90.

The gates GC, GD, GF, GJ and GK then come into operation and the counting sequences are reversed for the second quadrant.

At 180° (180th shift pulse) the bi-stable 180 is set.

The timing and waveform diagram in FIG. 22 facilitates understanding of this sequence of operations.

The counters are connected through inverting amplifiers marked A to their output terminals and the terminals of like reference in FIGS. 19, 20 and 21 are to be considered joined to one another.

The switch SL associated with the gate GS enables the counters to be stepped in a zero condition 0° to 180°, or in a maximum condition 90° or 270° by an appropriate setting of the switch SL. The terminal marked "Immediate" is provided for enabling counting to be stopped whenever required by means such as a push button switch.

In applying the generator just described for determining the transfer function of apparatus such as a servo, apparatus as shown in FIG. 23 can be used. In FIGS. 23 and 18 parts performing like functions have the same reference.

Initially the switches 83, 84, 85 and 86 are in the settings shown. The sine resolver 61' and cosine resolver 62' are identical with the generator described with reference to FIG. 19 the cosine resolver 62' being switched appropriately for the cosine phase.

Thus initially the action is as already described and the sine and cosine components appear in the outputs of the integrators 63' and 64'. The action will be understood from FIGS. 24A and B which are on the same time scale.

At the end of the integration period (that is after N cycles or when a steady state is reached if continuous averaging is used), if conversion from cartesian to polar co-ordinates is required the switches 83 and 86 are set to the opposite condition to that shown. The integrators now have no current input and are stabilised by resistors 112 and 113 connected to earth.

It will be seen that the sine and cosine resolvers use an auxiliary sequence controller 114 which is identical with the sequence controller described with reference to FIG. 21 and during the integration period is driven from the main clock-pulse generator.

It is arranged as will be described with reference to FIG. 25 that on switching over the switches 83 and 85 for cartesian-to-polar conversion the supply of shift pulses is switched from the main clock-pulse generator to an auxiliary clock-pulse generator in the form of a multivibrator.

Referring to FIG. 25 the circuit from the main clock-pulse generator 25 to the auxiliary sequence controller 114 includes a 2-gate 115 in the shift odd connection and a 2-gate 116 in the shift even connection. Similarly the circuit from the auxiliary clock-pulse generator shown at 117 to the auxiliary sequence controller 114 includes a 2-gate 118 in the shift odd connection and a 2-gate 119 in the shift even connection.

During integration a gating signal is applied through a terminal 120 to the 2-gates 115 and 116 whereby shift pulses from the main clock-pulse generator 25 are applied to the auxiliary sequence controller 114. For cartesian-to-polar conversion the gating signal is applied through a terminal 121 to the 2-gates 118 and 119 whereby shift pulses are applied from the auxiliary clock-pulse generator 117 to the auxiliary sequence controller 114.

With the switches 83 to 86 in the opposite setting to that shown and the auxiliary sequence controller 114 driven from the auxiliary clock-pulse generator the sine and cosine resolvers are cycled and their outputs are fed through switch contacts 110 and through an inverting amplifier 120 to a chopper 111 which can conveniently be driven by the auxiliary clock-pulse generator.

The input to the chopper is shown in FIG. 24C (the steps not shown in this figure) and the output therefrom in FIG. 24D. It is arranged that the chopper connects the output of the amplifier 120 to the comparator 87 at instants on each step in the waveform and between the vertical shifts from one step to another. This avoids difficulties that might arise from transients occurring in the shifts between steps.

At two points in a complete cycle of the resolvers the function $A \sin \phi + B \cos \phi$ will cross through zero volts. A stop-run bi-stable 112 is arranged to trigger on the reversal of polarity and to stop the auxiliary sequence controller. The setting of this is one in which $\phi = \theta$ from which $\theta$ can be decoded.

To obtain the value of R the switches 110, 121 and 122 are set to the opposite settings to those shown. This provides outputs from the resolvers representing $R \cos \phi \cos \theta$ and $R \sin \phi \sin \theta$.

These are added in the adder 88 to provide an output representing $R(\cos^2 \theta + \sin^2 \theta)$ which equals R.

It will be appreciated that the carrier supply is replaced in the sine and cosine resolvers with a D.C. supply in which the polarity of the D.C. is inverted at 180° in each cycle.

Furthermore when carrier current is used and a low-pass filter employed to remove harmonics in the output of the demodulator connected to the servo under test, in order to compensate for the delay introduced by the filter it is necessary merely to arrange that the delay is equal to one clock-pulse interval and to reverse the shift odd and shift even connections from the clock-pulse generator to the auxiliary sequence controller.

It will be appreciated from a consideration of the foregoing that the invention functions as a multiplier which multiplies $f(p)$ by $f(q)$ where $f(p)$ represents any current whether D. C. or oscillatory to be modulated by $f(q)$ the waveform generated by the switches 28 and 29.

What is claimed is:

1. Apparatus for generating a signal defined by particular characteristics of amplitude, wave form and frequencies, including;

first means for generating a first plurality of signals each having a first particular shape and each having an individual duration relative to the other signals in the first plurality and each having a particular time relation to the other signals in the first plurality, the first means generating the different signals in the first plurality to provide individual ones of such signals at the same time as other signals in the first plurality for a particular overlapping in time of the different signals in the first plurality, second means for generating a second plurality of signals each having a second particular shape different from the first particular shape and each having a particular time relation to the other signals in the second plurality, the second means generating the different signals in the second plurality to provide an overlapping in time between individual ones of the signals in the second plurality and individual ones of the signals in the first plurality, and third means coupled to the first and second means for superimposing the signals in the second plurality on the signals in the first plurality in the particular time relationships of such signals to produce the signal defined by the particular characteristics of amplitude, wave form and frequencies.

2. The apparatus set forth in claim 1 wherein:

the first means generates signals having a substantially rectangular wave form and the second means generates signals having a substantially triangular wave form.

3. The apparatus set forth in claim 1 wherein fourth means are included for generating substantially sinusoidal carrier signals and wherein the first means generate signals having a substantially rectangular wave form and wherein fifth means are provided for modulating the signals of substantially rectangular wave form from the first means on the carrier signals and for suppressing the carrier signals and wherein the second means generate signals having a substantially triangular wave form and wherein sixth means are provided for modulating the signals of substantially triangular wave form from the first means on the carrier signals and for suppressing the carrier signals.

4. The apparatus set forth in claim 1 wherein the signal produced by the third means has a particular fundamental component of frequency and wherein the apparatus further includes:
fourth means coupled to the third means for producing a second signal having the fundamental component of frequency,
fifth means coupled to the third and fourth means for producing a third signal representing the combination of the second signal and the signal from the third means,
sixth means coupled to the third and fourth means for producing a fourth signal representing the combination of the second signal and the signal from the third means, displaced in phase by substantially 90° at the fundamental component of frequency,
seventh means coupled to the fifth means for producing a fifth signal having characteristics representing the average amplitude and phase of the signal from the third means over a particular number of cycles of the fundamental component of frequency, and
eighth means coupled to the sixth means for producing a sixth signal having characteristics representing the average amplitude and phase of the signal from the third means, displaced in phase by substantially 90° at the fundamental component of frequency, over the particular number of cycles of the fundamental component of frequency.

5. The apparatus set forth in claim 4, including;
ninth means coupled to the seven and eighth means for combining the signals from the seven and eighth means in a first particular relationship to produce a seventh signal having characteristics representing the ratio of the average amplitude of the signal from the third means over the particular number of cycles of the fundamental component of frequency and the average amplitude of the signal from the third means, displaced in phase by substantially 90° at the fundamental component of frequency, over the particular number of cycles of the fundamental component of frequency, and
tenth means coupled to the seventh and eighth means for combining the signals from the seventh and eighth means in a second particular relationship to produce an eighth signal having characteristics representing the relative phase of the signal from the third means and the signal from the third means, displaced in phase by substantially 90° at the fundamental component of frequency.

6. The apparatus set forth in claim 4, including:
ninth means coupled to the seventh and eighth means for combining the signals from the seventh and eighth means in a first particular relationship to produce a seventh signal having characteristics representing the ratio of the average amplitude of the signal from the third means over the particular number of cycles of the fundamental component of frequency and the average amplitude of the signal from the third means, displaced in phase by substantially 90° at the fundamental component of frequency, over the particular number of cycles of the fundamental component of frequency, this ratio being multiplied by the sine of the relative phase of the signal from the third means and the signal from the third means, displaced in phase by substantially 90° at the fundamental component of frequency, and
tenth means coupled to the seventh and eighth means for combining the signals from the seventh and eighth means in a second particular relationship to produce an eighth signal having characteristics representing the ratio of the average amplitude of the signal from the third means over the particular number of cycles of the fundamental component of frequency and the average amplitude of the signal from the third means, displaced in phase by substantially 90° at the fundamental component of frequency, this ratio being multiplied by the cosine of the relative phase of the signal from the third means and the signal from the third means, displaced in phase by substantially 90° at the fundamental component of frequency.

7. The apparatus set forth in claim 4, wherein:
ninth means are provided for generating substantially sinusoidal carrier signals and wherein tenth means modulate the first plurality of signals on the carrier signals and suppress the carrier signals and wherein eleventh means modulate the second plurality of signals on the carrier signals and suppress the carrier signals and wherein the third means superimpose the signals from the tenth and eleventh means and wherein twelfth means are coupled to the third means to demodulate the signals from the third means to recover the signal defined by the particular characteristics of amplitude, wave form and frequencies and wherein the fifth means are coupled to the twelfth and fourth means to produce the third signal and wherein the sixth means are coupled to the twelfth and fourth means to produce the fourth signal.

8. Apparatus for generating a signal having a variable wave form defined by particular characteristics of amplitude, wave form and frequencies, including:
a first plurality of switching means operative in a particular sequence and for individual durations of time dependent upon the characteristics of amplitude, wave form and frequencies of the signal to be generated, the switching means in the first plurality being operative in individual combination at successive instants of time,
a second plurality of switching means operative in a particular sequence and for individual durations of time dependent upon the characteristics of amplitude, wave form and frequencies of the signal to be generated, the switching means in the second plurality being operative in individual combinations at successive instants of time, the switching means in the second plurality being operative during substantially the same time period as the switching means in the first plurality,
first means coupled to the switching means in the first plurality for generating at each instant first signals having individual levels and first particular characteristics dependent upon the particular combination of the switching means in the first plurality to be operative at that instant,
second means coupled to the switching means in the second plurality for generating at each instant second signals having second particular characteristics different from the first particular characteristics and dependent upon the particular combination of the switching means in the second plurality to be operative at that instant, and
third means coupled to the first and second means for superimposing the second signals on the first signals in a particular relationship to produce the signal defined by the particular characteristics of amplitude, wave form and frequencies.

9. The apparatus set forth in claim 8 wherein:
the first means generates the first signals with substantially rectangular characteristics and with an amplitude at each instant dependent upon the combination of the first switching means in the plurality to be operated at that instant and wherein the second means generates the second signals with substantially triangular characteristics.

10. The apparatus set forth in claim 8 wherein fourth means are included for generating substantially sinusoidal carrier signals and wherein the first means generate the first signals with substantially rectangular wave forms and wherein fifth means are provided for modulating the signals of substantially rectangular wave form from the first means on the carrier signals and for suppressing the carrier signals and wherein the second means generate the signals with substantially triangular wave forms and wherein sixth means are provided for modulating the signals of substantially triangular wave form from the first means on the carrier signals and for suppressing the carrier signals.

11. Apparatus for generating a signal defined by particular characteristics of amplitude, wave form and frequencies, including:
  first means for generating a first plurality of signals having substantially rectangular characteristics from a first particular reference value with individual durations dependent upon the particular characteristics of amplitude, wave form and frequencies of the signal to be generated,
  second means for generating a second plurality of signals having a particular wave form and upwardly sloping characteristics from the first particular reference value,
  third means for generating a third plurality of signals having the particular wave form and downwardly sloping characteristics to the first particular reference value,
  fourth means coupled to the second and third means for selecting the signals in the second plurality for portions of the signal to be generated with a rising amplitude and for selecting the signals in the third plurality for portions of the signal to be generated with a rising amplitude and for selecting the signals in the third plurality for portions of the signal to be generated with a falling amplitude, and
  fifth means coupled to the first and fourth means for superimposing the signals provided by the fourth means on the signals provided by the first means to produce the signal defined by the particular characteristics of amplitude, wave form and frequencies.

12. Apparatus as set forth in claim 11 wherein the second and third means generate signals having a substantially saw tooth wave form.

13. The combination set forth in claim 11 wherein means are coupled to the first means for adjusting the magnitudes of the signals of substantially rectangular characteristics and are respectively coupled to the second and third means for adjusting the peak values of the signals in the second and third pluralities.

14. In apparatus for generating a signal having a variable wave form defined by particular characteristics of amplitude, wave form and frequencies,
  first means for generating first signals having upwardly sloping characteristics from a first particular value and having a particular wave form,
  second means for generating second signals having downwardly sloping characteristics to the first particular value and having the particular wave form, and
  third means coupled to the first and second means for selecting, only at first, individual times, the first signals for an upwardly rising characteristic of the signal having the variable wave form and for selecting, only at second individual times different from the first individual times, the second signals for a downwardly falling characteristic of the signal having the variable wave form.

15. In the apparatus set forth in claim 8, the first means generating the first signals with substantially sawtooth wave forms having upwardly sloping characteristics from the first particular value and the second means generating the second signals with the substantially sawtooth wave forms having downwardly sloping value to the first particular characteristics.

16. In combination:
  first means for generating a first plurality of signals each having a first particular shape and each having an individual duration and each having a particular time relation to the other signals in the first plurality,
  second means for generating a second plurality of signals each having a second particular shape different from the first particular shape and each having a particular time relation to the other signals in the second plurality and to the signals in the first plurality and each recurring simultaneously with signals in the first plurality,
  third means coupled to the first and second means for superposing the signals in the first and second pluralities in a first particular relationship to produce a first signal having a substantially sinusoidal wave form,
  fourth means for producing a second signal having the substantially sinusoidal wave form and having a phase displacement of substantially 90° relative to the signal from the third means,
  fifth means for providing a signal having a variable phase and amplitude, and
  sixth means coupled to the third and fourth means for operating upon the signals from the third and fourth and fifth means in a second particular relationship to provide an indication of the variable phase of the signal produced by the fifth means relative to the phase of the signals from the third and fourth means.

17. The combination set forth in claim 16 wherein:
  the fifth means provides an indication in polar coordinates of the signal produced by the third means.

18. The combination set forth in claim 16 wherein the fourth means includes:
  seventh means for generating a third plurality of signals each having the first particular shape and each having an individual duration and each having a particular time relation to the other signals in the third plurality,
  eighth means for generating a fourth plurality of signals each having the second particular shape and each having a particular time relation to the other signals in the fourth plurality and to the signals in the third plurality and each occurring simultaneously with signals in the third plurality, and
  ninth means coupled to the seventh and eighth means for combining the signals in the third and fourth pluralities to produce a second signal.

19. The combination set forth in claim 16 wherein the first means is constructed to provide the signals in the first plurality with rectangular characteristics and the second means is constructed to provide the signals in the second plurality with triangular characteristics.

20. The combination set forth in claim 19 wherein the sixth means compares the phase of the signal from the fifth means with the phases of the signals from the third and fourth means to provide an indication of the signal from the fifth means.

21. The combination set forth in claim 16 wherein:
  seventh means are provided to produce periodic clock signals at substantially equally spaced intervals dependent upon the frequency desired for the first and second signals of substantially sinusoidal wave form and wherein the first means are coupled to the seventh means to generate the signals in the first plurality in accordance with the occurrence of the clock signals and wherein the second means are coupled to the seventh means to generate the signals in the second plurality in accordance with the occurrence of the clock signals.

22. In combination for generating a particular signal defined by particular characteristics of amplitude, wave form and frequencies and defined by positive and negative portions,
  first means for providing first signals each having a wave shape defined by a first portion inclined from a particular value and a second portion sharply falling toward the particular value from the first portion, second means for providing second signals each having a wave shape defined by a first portion declined toward the particular value and a second portion sharply inclined from the first portion of the second signal, third means for providing signals representing whether the signal to be generated has a positive polarity or a negative polarity at each instant, and fourth means coupled to the first, second and third means for selecting the first signals to generate for the particular signal a portion inclined from the particular value and having a positive polarity with an increasing magnitude and a portion declined from the particular value and having a negative polarity with an increasing magnitude and for selecting the second signals to generate for the particular signal a portion declined toward the particular value and having a negative polarity with a decreasing magnitude and a portion inclined toward the particular value and having a positive polarity with a decreasing magnitude.

23. In the combination set forth in claim 22:
the first means being constructed to provide the first signals with substantially sawtooth characteristics defined by the first portion and the second portion and the second means being constructed to provide the second signals with substantially sawtooth characteristics defined by the first portion and the second portion.

24. In combination for generating a particular signal defined by particular characteristics of amplitude, wave form and frequencies and defined by positive and negative portions, first means for providing first signals each having a wave shape defined by a first portion inclined from a particular value and a second portion sharply falling toward the particular value from the first portion, second means for providing second signals each having a wave shape defined by a first portion declined toward the particular value and a second portion sharply rising from the first portion of the second signal, third means for providing signals representing whether the signal to be generated has a positive or negative polarity at each instant.

fourth means coupled to the first, second and third means for selecting the first signals at first particular times to generate for the particular signal a portion inclined from the particular value and having a positive polarity with an increasing magnitude and a portion declined from the particular value and having a negative polarity with an increasing magnitude and for selecting the second signals at second particular times different from the first particular times to generate for the particular signal a portion inclined toward the particular value and having a negative polarity with a decreasing magnitude and a portion declined toward the particular value and having a positive polarity with a decreasing magnitude, fifth means for providing third signals each having a particular wave shape different from the wave shapes of the first and second signals and having an individual duration and having an individual time of occurrence relative to the other signals in the third plurality, sixth means coupled to the third and fourth means for inverting the polarity of the signals from the fourth means upon a representation of a negative polarity by the third means, seventh means coupled to the third and fifth means for inverting the polarity of the signals from the fifth means upon a representation of a negative polarity by the third means, and eighth means coupled to the fourth, fifth, sixth and seventh means for combining the signals from the fourth, fifth, sixth and seventh means to generate the particular signal defined by the particular characteristics of amplitude, wave form and frequencies and defined by the positive and negative portions.

25. The combination set forth in claim 24 wherein:
the first means is constructed to provide the first signals with substantially sawtooth characteristics having a wave shape defined by the first portion and the second portion and the second means is constructed to provide the second signals with substantially sawtooth characteristics having a wave shape defined by the first portion and the second portion and wherein the fifth means is constructed to provide the third signals with rectangular characteristics.

26. The combination set forth in claim 24 wherein
means are provided for periodically producing clock signals substantially equally spaced from one another by periods of time dependent upon the frequency desired for the particular signal and wherein the fifth means are operatively coupled to the clock signal means for providing the third signals in accordance with the production of the clock signals and wherein the first means are operatively coupled to the clock signal means for providing the first signals in accordance with the production of the clock signals and wherein the second means are operatively coupled to the clock signal means for providing the second signals in accordance with the production of the clock signals and wherein the clock signal means are adjustable to control the periodicity of the clock signals in accordance with the frequency desired for the particular signal.

27. The combination set forth in claim 24 wherein the particular signal has substantially sinusoidal characteristics and constitutes a first output signal and wherein means are provided for producing a second output signal having substantially sinusoidal characteristics and having a phase displaced by substantially 90° from the first output signal and wherein means are provided for producing a signal having a particular phase and wherein means are provided for comparing the phases of the first and second output signals with the phase of the signal having the particular phase to provide a determination of the particular phase.

28. A method of generating an electric oscillation of given wave form, frequency and amplitude, comprising the steps of
generating a plurality of separate currents of substantially rectangular wave form and of first and second opposite polarities in a first particular timed relationship of overlapping time characteristics of the separate currents of substantially rectangular wave form to one another, generating a plurality of currents of substantially triangular wave form and of the first and second opposite polarities in a second particular timed relationship of the separate currents of substantially triangular wave form to one another and to the separate currents of substantially rectangular wave form and coincidental in time with the separate currents of substantially rectangular wave form, and superimposing the currents of triangular wave form on the currents of substantially rectangular wave form in the first and second particular timed relationships of the different currents of substantially rectangular and substantailly triangular wave forms to one another to provide an oscillatory current of the given wave form, frequency and amplitude.

29. In combination for producing an output signal having particular amplitude characteristics with time,
a source of voltage having characteristics different from the particular characteristics,
a first plurality of switching means having first and second states of operation and normally operative in the first state and coupled to the source of voltage for producing a first voltage in the first state of operation and for producing in the second state of operation a second voltage different from the first voltage, first means coupled to the switching means in the first plurality for sequentially and individually triggering the switching means to the second state of operation in a first particular timed relationship and for sequentially and individually triggering the switching means back to the first state of operation in a second particular timed relationship to obtain the production of substantially rectangular pulses of voltage of individual duration by each switching means in the first plurality, a second plurality of switching means having first and second states of operation and normally operated in the first state to produce the first voltage, second means coupled to the switching means in the second plurality for sequentially and individually operating upon the switching means in a particular timed relationship to obtain the operation of each switching means in the second state of operation for an individual duration and to obtain the production of voltage pulses of substantially triangular wave shape during the operation of such switching means in the second state, and third means coupled to the first and second means for combining the second voltages produced by the first means at successive instants of time and the voltage pulses of substantially triangular wave form from the second means at such successive instants of time to produce the output signal.

30. The combination set forth in claim 29 wherein the output signal has alternating characteristics with positive and negative polarities and wherein means are coupled to the first and second means for inverting the polarities of the signals from the first and second means dependent upon whether or not the alternating output signal is changing from positive to negative polarities.

31. The combination set forth in claim 29 wherein the output signal has substantially sinusoidal characteristics and wherein fourth means are provided for generating a second signal having substantially sinusoidal characteristics and having a phase displacement of substantially 90° from the output signal and wherein fifth means are provided to produce a signal having a particular phase and wherein sixth means are provided for comparing the phases of the output signal and the second signal with the signal having the particular phase to determine the particular phase relative to the phases of the output signal and the second signal.

32. The combination set forth in claim 29 wherein the voltage from the source is adjustable to provide corresponding variations in the magnitudes of the substantially rectangular pulses of voltage and the magnitudes of the voltage pulses of substantially triangular wave shape.

33. In combination for producing an output signal having particular amplitude characteristics with time, a source of voltage having characteristics different from the particular characteristics, a first plurality of switching means having first and second states of operation and normally operative in the first state and coupled to the source of voltage for producing a first voltage in the first state of operation and for producing in the second state of operation a second voltage different from the first voltage, first means coupled to the switching means in the first plurality for sequentially and individually triggering the switch means to the second state of operation in a first particular timed relationship and for sequentially and individually triggering the switching means back to the first state of operation in a second particular timed relationship to obtain the production of substantially rectangular pulses of voltage of individual duration by each switching means in the first plurality, a second plurality of switching means having first and second states of operation and normally operating in the first state to produce the first voltage, second means coupled to the switching means in the second plurality for sequentially and individually operating upon the switching means in a particular timed relationship to obtain the operation of each switching means in the second plurality in the second state of operation for an individual duration and to obtain the production of voltage pulses of substantially triangular wave form during the operation of such switching means in the second state, inverter means coupled to the second means in the second plurality for inverting the substantially triangular wave shape produced by such second means, control means coupled to the second means and to the inverter means for individually selecting at successive instants of time individual ones of the voltages produced by the second means and the inverter means dependent upon whether the amplitude of the output signal is increasing or decreasing at such successive instants of time, and means electrically coupled to the control means and the first means for combining the signals from such control means and the second means to produce the output signal.

34. The combination set forth in claim 33 wherein the output signal has alternating characteristics with positive and negative polarities and wherein means are electrically coupled to the first means and to the control means for inverting the polarities of the signals from such first means and the control means dependent upon whether the alternating output signal is changing from positive to negative polarities.

35. The combination set forth in claim 33 wherein means are provided for periodically producing clock signals substantially equally spaced from one another by periods of time dependent upon the frequency desired for the output signal and wherein the first means are operatively coupled to the clock signal means to sequentially trigger the switching means in the first plurality between the first and second states in accordance with the production of the clock signals and wherein the second means are operatively coupled to the clock signal means to sequentially trigger the switching means in the second plurality between the first and second states in accordance with the production of the clock signals and wherein means are provided for varying the periodicity of the clock signals from the clock signal means.

36. The combination set forth in claim 35 wherein the output signal constitutes a first output signal having substantially sinusoidal characteristics and wherein means are provided for generating a second output signal having substantially sinusoidal characteristics and having a phase displacement of substantially 90° from the first output signal and wherein means are provided for producing a signal having a particular phase and wherein means are provided for comparing the phases of the first and second output signals with the phase of the signal having the particular phase to provide a determination of the particular phase.

37. In combination for generating a particular signal defined by particular characteristics of amplitude, wave form and frequencies and defined by positive and negative portions, first means for generating a plurality of periodically recurring signals, second means responsive to the periodically recurring signals for generating first signals having a stepped triangular wave form with an amplitude progressively changing at the end of each step and with the steps synchronized with the production of the periodically recurring signals, third means responsive to the generation of particular numbers of steps in the first signals for receiving the first signals to produce output signals having characteristics representing the weighted effects of the amplitudes produced at the completion of the first signals, fourth means for providing signals representing whether the signal to be generated has a positive or negative polarity at each instant, and fifth means coupled to the third and four means for combining the output signals in accordance with the signals from the fourth means to produce the particular signal.

38. The combination set forth in claim 37 wherein the first means are adjustable to control the periodicity of the periodically recurring signals in accordance with the frequencies desired for the particular signal.

39. The combination set forth in claim 38 wherein the particular signal constitutes a substantially sinusoidal wave form and wherein means are responsive to the substantially sinusoidal wave form for producing a second particular signal having a phase displacement of substantially 90° relative to the particular signal and wherein means are included for providing a signal having a variable phase and wherein means are responsive to the particular signal and the second particular signal and the signal of variable phase for operating upon these signals in a particular relationship to provide an indication of the variable phase of the signal from the last mentioned means relative to the phase of the particular signal and the second particular signal.

References Cited

UNITED STATES PATENTS

| 2,602,136 | 7/1952 | Kenyon et al. | 328—59 XR |
| 2,807,750 | 9/1957 | Hobbs | 315—24 |
| 2,992,365 | 7/1961 | Brill | 324—103 XR |
| 3,166,712 | 1/1965 | Graham | 325—321 |

RUDOLPH V. ROLINEC, *Primary Examiner.*

WALTER L. CARLSON, *Examiner.*

E. E. KUBASIEWICZ, *Assistant Examiner.*